(12) United States Patent
Mashiko

(10) Patent No.: US 6,468,121 B1
(45) Date of Patent: Oct. 22, 2002

(54) ENGINE FOR SMALL WATERCRAFT

(75) Inventor: Tetsuya Mashiko, Shizuoka (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 09/329,981

(22) Filed: Jun. 10, 1999

(30) Foreign Application Priority Data

| Jun. 10, 1998 | (JP) | ............................................. | 10-162588 |
| Jun. 10, 1998 | (JP) | ............................................. | 10-162589 |
| Jun. 10, 1998 | (JP) | ............................................. | 10-162590 |
| Jun. 10, 1998 | (JP) | ............................................. | 10-162591 |

(51) Int. Cl.$^7$ .......................... B63H 21/10; B63H 21/32
(52) U.S. Cl. .......................... 440/88; 440/89; 123/583
(58) Field of Search .................. 440/88, 89; 114/55.5; 123/52.1, 184.21, 184.46, 579, 580, 583; 261/23.2

(56) References Cited

U.S. PATENT DOCUMENTS

| 3,030,819 | A | * | 4/1962 | Edelbrock, Jr. | ............... | 74/471 |
| 4,243,000 | A | * | 1/1981 | Yamada | ....................... | 123/442 |
| 4,333,888 | A | * | 6/1982 | Onofrio | ..................... | 261/34 B |
| 4,957,664 | A | * | 9/1990 | Kohno et al. | ............... | 261/34.2 |
| 4,995,370 | A | * | 2/1991 | Imaeda et al. | .............. | 123/583 |
| 4,997,399 | A | * | 3/1991 | Nakayasu et al. | ............ | 440/88 |
| 5,134,851 | A | * | 8/1992 | Davis | ........................... | 60/313 |
| 5,489,227 | A | * | 2/1996 | Ishida et al. | .................. | 440/77 |
| 5,531,620 | A | * | 7/1996 | Ozawa et al. | ................. | 440/89 |
| 5,572,943 | A | | 11/1996 | Kobayashi et al. | | |
| 5,732,685 | A | * | 3/1998 | Nakamura | ................... | 123/514 |
| 5,749,338 | A | * | 5/1998 | Gohara et al. | .............. | 123/73 A |
| 5,820,426 | A | * | 10/1998 | Hale | ............... | 440/88 |
| 5,827,096 | A | * | 10/1998 | Mineo | .......................... | 440/89 |
| 5,902,161 | A | * | 5/1999 | Nakase | ......................... | 440/88 |
| 5,911,609 | A | * | 6/1999 | Fujimoto et al. | ............. | 440/89 |
| 5,967,861 | A | * | 10/1999 | Ozawa et al. | .................. | 440/1 |
| 6,000,371 | A | * | 12/1999 | Henmi | .................. | 123/184.46 |
| 6,016,782 | A | * | 1/2000 | Henmi | .................. | 123/184.46 |
| 6,029,639 | A | * | 2/2000 | Mashiko | ..................... | 123/579 |

OTHER PUBLICATIONS

1997 Sea Doo Parts Catalog, XP 5662, Bombardier, Inc., Apr. 1997.
1997 Sea Doo Parts Catalog, GTS 5818 and GTI 5841, Bombardier, Inc., Oct. 1996.
1998 Sea Doo Parts Catalog, GSX Limited 5625, Bombardier, Inc., Jun. 1997.
1997 Sea Doo Parts Catalog, GTX 5642, Bombardier, Inc., Oct. 1996.
1998 Parts Catalogue, GP800W (GU01), 22 pages.
Parts Catalogue Model Year 1999, XL1200LTD in sixteen (16) pages.
Personal Watercraft Illustrated, Sep. 1999, vol. 13, No. 9, four (4) pages.

* cited by examiner

*Primary Examiner*—S. Joseph Morano
*Assistant Examiner*—Ajay Vasudeva
(74) *Attorney, Agent, or Firm*—Knobbe, Martens, Olson & Bear, LLP

(57) ABSTRACT

An engine for a small watercraft, having an exhaust system that extends from an engine body and then generally surrounds the engine body. An air chamber of an air induction system for the engine, which has a relatively large volume, is located under the exhaust system. An exhaust manifold of the exhaust system has a slant opening, from which the other components of the exhaust system extends. A single, rigid coolant delivery conduit is affixed to the exhaust manifold so that a coolant jacket therein can be supplied with coolant through the delivery conduit. A plurality of carburetors each having a throttle valve are provided for the engine. A control mechanism for controlling an opening of the throttle valves is positioned at one side of the carburetors, while an interlocking mechanism for activating the throttle valves synthetically is positioned at another side of the carburetors.

51 Claims, 16 Drawing Sheets

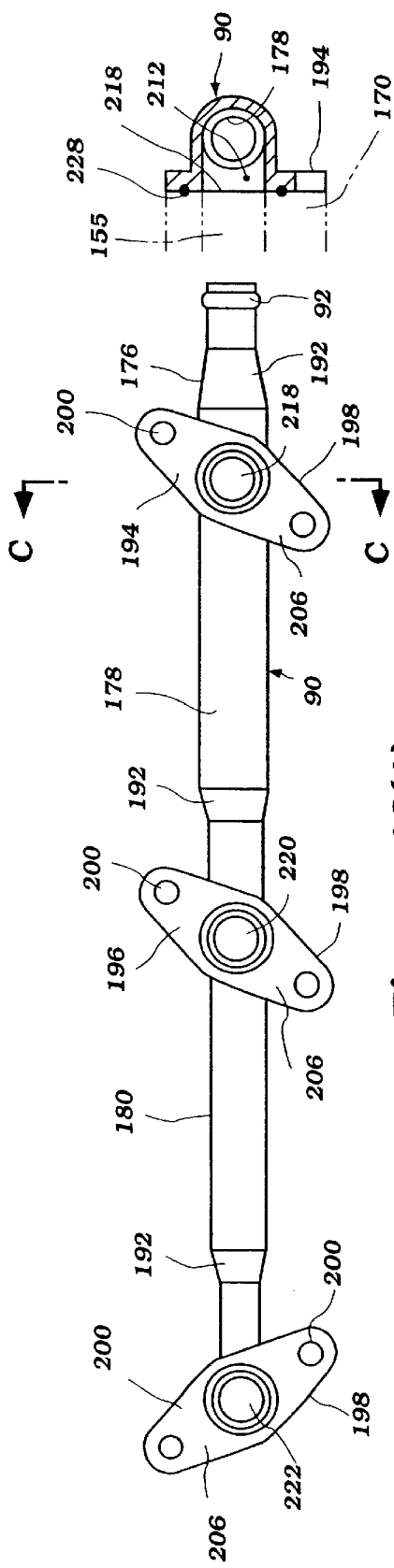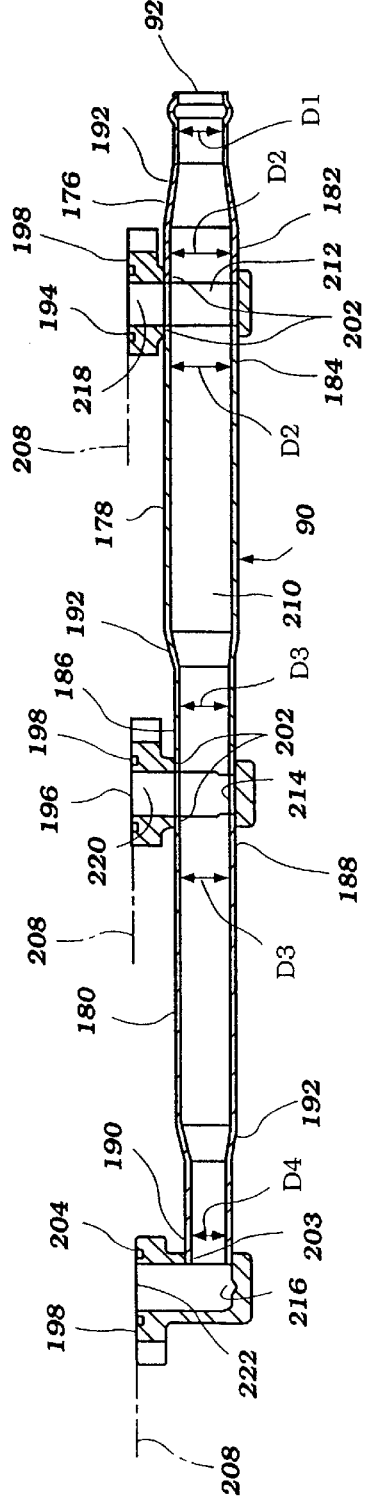
Figure 13(A)
Figure 13(B)
Figure 13(C)

ENGINE FOR SMALL WATERCRAFT

BACKGROUND OF THE INVENTION

1. Field of the Invention

This invention relates to a small watercraft and more particularly to the layout of engine components within the watercraft.

2. Description of Related Art

Personal watercrafts have become very popular in recent years. This type of watercraft is sporting in nature and carries one, two or three passengers. A relatively small hull of the personal watercraft commonly defines a rider's area above an engine compartment. An internal combustion engine frequently powers a jet propulsion unit which propels the watercraft. The engine lies within the engine compartment in front of a tunnel formed on the underside of the watercraft hull. The jet propulsion unit is located within the tunnel and is driven by a driveshaft. The driveshaft usually extends between the engine and the jet propulsion device, through a wall of the hull tunnel.

The engine generally has an air induction system and an exhaust system both are completely dispersed onto the starboard and the port side. However, if the engine has a relatively large displacement and/or a plurality of combustion chambers for increasing its power output, the exhaust system must have a long exhaust conduit that surrounds the engine per se. In other words, the exhaust conduit extends to the space where the air induction system is located because the engine compartment is only allowed to have a limited space within the small watercraft.

For example, an exhaust manifold is connected to exhaust ports that open at a side wall of a cylinder block. An exhaust conduit extends from the exhaust manifold forwardly, then crosses the front and upper portion of the cylinder block and goes to rearwardly along the opposite side wall. After that, the exhaust conduit is turned from the upper position of the opposite side wall to the lower position slantwise at the rear portion of the cylinder block. Then, the exhaust conduit is finally connected, via a water lock, to a side wall of a jet pump compartment for opening thereto.

As is apparently understood, the capacity for the air induction system is restricted unless any measures are taken in this arrangement. The air induction system generally has an air chamber or silencer at its tip portion, which must have a relatively large volume for proper function. However, this volume will be reduced in the aforenoted arrangement. Unless the induction system has a sufficient volume, a necessary amount of air charge for combustion may not be supplied to the combustion chamber(s).

Also, if an outlet opening of the exhaust manifold opens upwardly, the exhaust conduit extends upwardly from the outlet opening of the exhaust manifold. However, because of the compact nature of the engine compartment again, the height of the exhaust conduit is restricted. Thus, it is necessary to bend the exhaust conduit with a relatively small curvature. This small curvature, however, is likely to hinder exhaust gasses from smooth flowing at the connecting portion of the exhaust manifold with the exhaust conduit. As a result, the attempt for increasing power output of the engine is greatly difficult.

Further, if the engine has multiple combustion chambers, usually it is equipped with a plurality of carburetors corresponding to the respective combustion chambers. The multiple carburetors are located at one side of the cylinder block so that each carburetor is positioned at each combustion chamber. As described above, some part of the exhaust conduit is also placed at this side of the cylinder block. Conventionally, all of control members for the carburetors are usually positioned at upper sides thereof Generally, the control members are throttle levers for operating respective throttle valve shafts, a rod for connecting the multiple throttle levers, a pulley connected to one of the throttle valves and a control wire wound around the pulley and connected to an accelerator positioned at a steering handle of the watercraft. In addition, an adjuster for adjusting idle openings of respective carburetors is also placed at the same upper side thereof so that a passenger or rider of the watercraft may easily access to them for the adjustment.

However, due to the abovedescribed arrangement of the exhaust system, the throttle levers are likely to be influenced by heat which the exhaust conduit may have during the engine operation. This causes thermal expansion in the control members of the carburetors because the members are made of metal. Accordingly, errors in movements of the control members can occur.

Also, in order to prevent the throttle levers and the pulleys from interfering with each other, either one of them should be somewhat remotely located from the carburetor bodies. This gives rise to need of large sized carburetors.

It is, therefore, a principal object of this invention to provide a compact engine that is most suitable to the small watercraft described above.

It is another object of this invention to provide an engine wherein an air chamber in an air induction system has the utmost volume even though an exhaust system is located in the proximity to the air chamber.

It is a further object of this invention to provide an engine that has an exhaust system through which exhaust gasses flow smoothly.

It is still a further object of this invention to provide an engine wherein throttle valve control members are disposed in compact nature on carburetors without producing any damages by heat from an exhaust system located in the proximity to the carburetors.

In addition, a cooling system for the engine of the small watercraft, specifically an engine block and an exhaust system, is arranged to be supplied with water, as a coolant, that is partially divided from the pressurized water generated by the jet propulsion unit in the hull tunnel.

The divided and pressurized coolant or cooling water is sent to a water jacket in the exhaust manifold with cooling water delivery pipes. The water goes to a water jacket in the engine body and then goes to a water jacket in the exhaust conduit. After that, it is delivered to the inside of the exhaust conduit per se upstream of the water lock so as to cool exhaust gasses therein and finally discharged to the outside of the watercraft.

Conventionally, each of the cooling water delivery pipes is made of rubber and connected independently to each inlet opening formed at respective branch portions of the exhaust manifold that correspond to respective cylinders or combustion chambers of the engine. However, the respective delivery pipes generally have different lengths from the jet propulsion unit. Because of this arrangement, it is difficult to deliver cooling water uniformly to respective cylinders and it is not an easy work to connect respective delivery pipes to the respective inlet openings of the exhaust manifold.

It is, therefore, still another object of this invention to provide an engine wherein cooling water can be uniformly delivered to respective cylinders and also the work for furnishing a delivery pipe is relatively easy.

Further, some carburetors have an acceleration pump mechanism to increase fuel supply when the rider desires to accelerate the watercraft. However, if air or bubbles exist in the acceleration pump mechanism and/or contiguous fuel supply pipes, performance of the carburetors for acceleration can be damaged.

It is, therefore, a further object of this invention to provide an engine wherein carburetors are allowed to discharge bubbles as soon as possible.

SUMMARY OF THE INVENTION

In accordance with a first aspect of this invention, an engine is adapted to be embodied in a watercraft having a hull and a propulsion device carried by the hull and driven by the engine for propelling the watercraft. The engine comprises an engine body having at least one combustion chamber. The engine also comprises an air induction system extending from the engine body for inducing air charge into the combustion chamber and an exhaust system extending from the engine body for discharging exhaust gasses from the combustion chamber. The air induction system includes an air chamber having a relatively large volume. The exhaust system includes a passage portion existing in the proximity to the engine body. At least a part of the air chamber of the air induction system is placed under the passage portion of the exhaust system.

In accordance with a second aspect of this invention, an engine is adapted to be embodied in a watercraft having a hull and a propulsion device carried by the hull and driven by the engine for propelling the watercraft. The engine comprises an engine body having a plurality of combustion chambers and an exhaust system for discharging exhaust gasses from the combustion chambers. The exhaust system includes an exhaust manifold extending from the engine body and having an opening end, and a contiguous conduit connected to the opening end of the exhaust manifold and extending generally along the engine body. The opening end of the exhaust manifold inclines toward the direction in which the contiguous conduit extends.

In accordance with a third aspect of this invention, an engine is adapted to be embodied in a watercraft having a hull and a propulsion device carried by the hull and driven by the engine for propelling the watercraft. The engine comprises an engine body having a plurality of combustion chambers, an exhaust system for discharging exhaust gasses from the combustion chambers and a cooling system for cooling the engine body and the exhaust system. The exhaust system includes an exhaust manifold extending from the engine body and having a plurality of branches corresponding to the combustion chambers. The cooling system includes a coolant jacket extending through the manifold. The coolant jacket has openings at each end of the branches. The engine further comprises a single coolant delivery conduit having delivery openings connected to the branch openings for delivering coolant.

In accordance with a fourth aspect of this invention, an engine is adapted to be embodied in a watercraft having a hull defining a rider's area and a propulsion device carried by the hull and driven by the engine for propelling the watercraft. The engine comprises an engine body having a plurality of combustion chambers. The engine also comprises a plurality of carburetors corresponding to the combustion chambers and each having a throttle valve for supplying air fuel mixture for combustion in the each combustion chamber. The engine further comprises a control mechanism for controlling an opening of the throttle valve remotely from the rider's area. The engine still further comprises an interlocking mechanism for activating the throttle valves synthetically. The control mechanism is positioned at one side of the carburetors and the interlocking mechanism is positioned at another side of the carburetors.

In accordance with a fifth aspect of this invention, an engine is adapted to be embodied in a watercraft having a hull and a propulsion device carried by the hull and driven by the engine for propelling the watercraft. The engine comprises an engine body having a plurality of combustion chambers and a plurality of carburetors corresponding to the combustion chambers having throttle valves for supplying air fuel mixture for combustion in the each combustion chamber. The engine further comprises a fuel increase mechanism placed at one carburetor located at the most rearward position relative to the watercraft and having fuel supply conduits for supplying fuel to the respective carburetors.

Further aspects, features and advantages of this invention will be become apparent from the detailed description of the preferred embodiments which follow.

BRIEF DESCRIPTION OF THE DRAWINGS

FIGS. 3, 5 and 6 show partially cross-sectional views.

FIGS. 13(A), (B), (C) and (D) show the cooling delivery pipe in detail. FIG. 13(A) is a front view thereof. FIG. 13(B) is a cross-sectional side view thereof. FIG. 13(C) is a cross-sectional view thereof, taken along the line C—C in FIG. 13(A).

DETAILED DESCRIPTION OF THE PREFERRED EMBODIMENTS OF THE INVENTION

Figure 1:
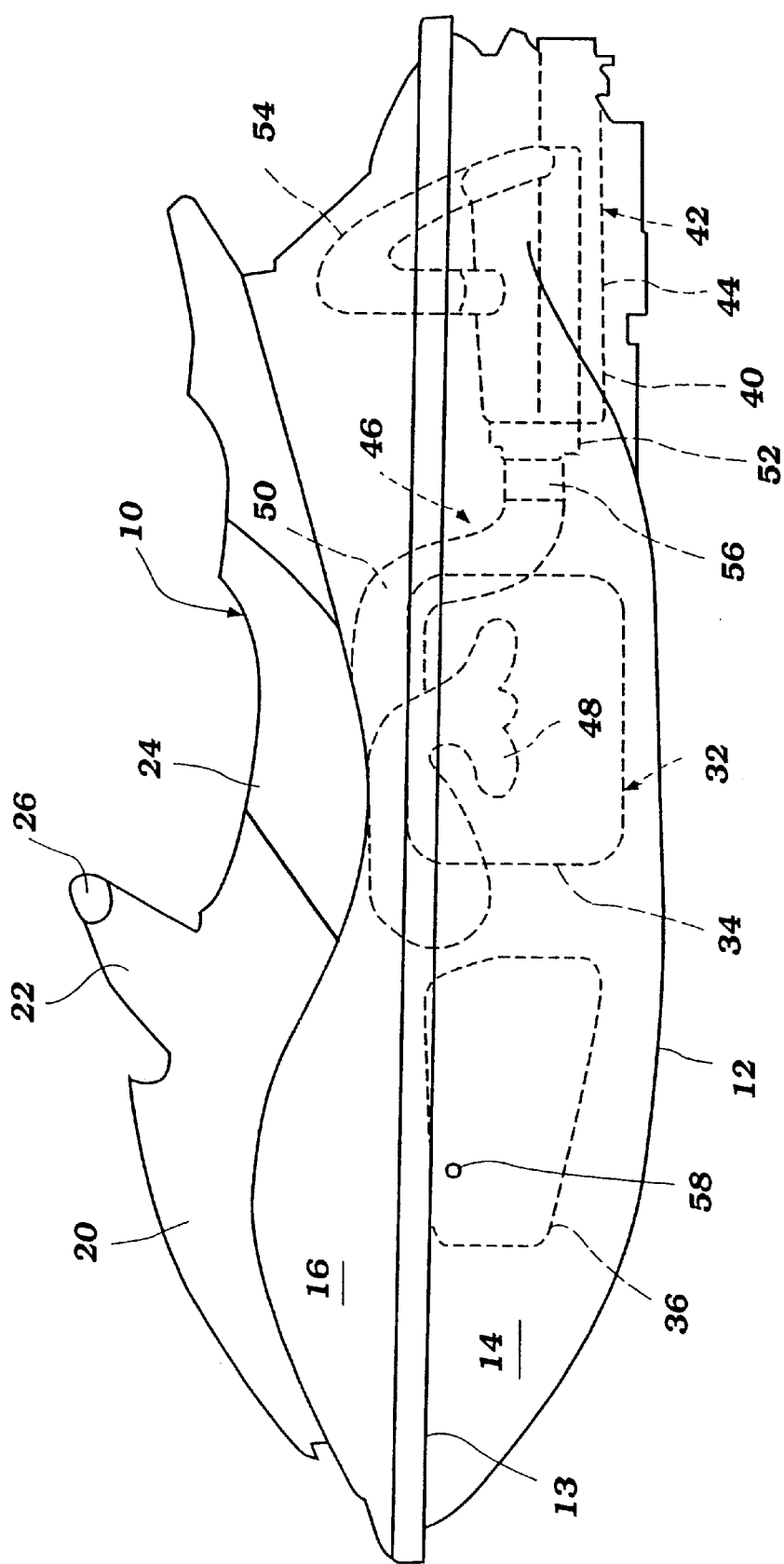
FIG. 1 is a side elevational view showing a personal watercraft as a preferred embodiment of this invention and illustrates several internal components of the watercraft in phantom.
Figure 2:
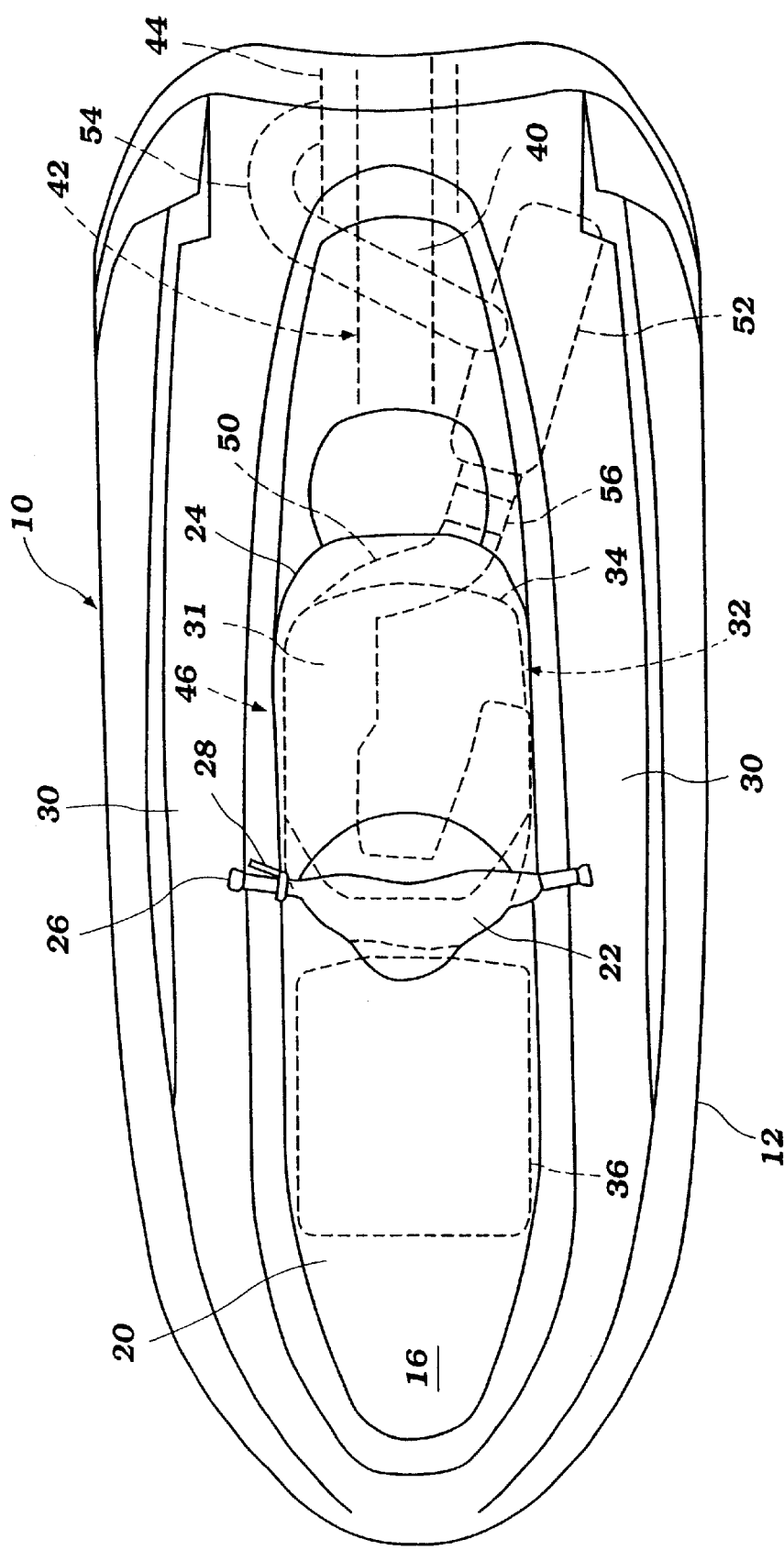
FIG. 2 is a top plan view of the same watercraft and the internal components are also shown in phantom.

FIGS. 1 through 2 illustrate a personal watercraft 10 which includes an associated engine component layout configured in accordance with a preferred embodiment of this invention. Although these features are illustrated in connection with a personal watercraft, they can be used with other types of watercraft as well, such as, for example, but without limitation, small jet boats and the like.

Before describing the engine component layout, an exemplary personal watercraft 10 will first be described with reference to FIGS. 1 and 2 in general details to assist the reader's understanding of the environment of use.

FIG. 1 is a side elevational view of the personal watercraft 10 and illustrates several internal components of the watercraft in phantom. FIG. 2 is a top plan view of the same watercraft and the internal components are also shown in phantom. The internal components are illustrated schematically and thus the locations of these components are primarily indicated rather than exact shapes of them.

The watercraft 10 includes a hull 12 formed by a lower hull section 14 and an upper hull or deck section 16. The hull sections 14, 16 are formed from a suitable material such as, for example, a molded fiberglass reinforced resin. The lower hull section 14 and the upper hull section 16 are fixed to each other around the peripheral edges 18 in any suitable manner.

As viewed in the direction from the bow to the stern of the watercraft, the upper hull section 16 includes a bow portion 20, a control mast 22 and a rider's area or a seat assembly 24. The bow portion 20 slopes upwardly toward the control mast 22 and includes at least one air duct (not shown) through which air can enter the hull 12.

The control must 22 extends upward from the bow portion 20 and supports a handle bar assembly 26. The handle bar 26 controls the steering of the watercraft 10 in a conventional manner. The handle bar assembly 26 also carries a variety of controls of the watercraft 10, such as a throttle control lever 28. The throttle control lever 28 is provided for controlling throttle valve openings of carburetors and will be described more in detail later.

The seat assembly 24 has a longitudinally extending straddle-type shape which may be straddled by a rider or passenger. Foot areas 30 are provided both sides of the seat assembly 24 at the top surface of the upper hull section 16. The seat assembly 24, at least in principal part, is formed by a cushion supported by the upper hull section 16. The seat assembly 24 is removably attached to the upper hull section 16 and an access opening 31 is provided at the upper hull section 16 through which the rider is accessible to an engine compartment 32 which is located under the seat assembly 24. That is, the seat assembly 24 is a cover member of the access opening. When the seat assembly 24 is attached to the access opening 31, the opening 31 is water tightly sealed.

The lower hull 14 principally defines the engine compartment 32. Except for the air duct, the engine compartment 32 is normally substantially sealed so as to enclose an engine 34 and a fuel system including a fuel supply tank 36 from the body of water in which the watercraft is operated. The fuel supply tank 36 is located in front of the engine compartment 32.

The engine 34 is of a water-cooled, three cylinder type and operates on a tow stroke, crankcase compression principle. The engine 34, thus, has three cylinder bores or combustion chambers spaced along the longitudinal axis of the watercraft 10. Although the invention is described in conjunction with an engine having this cylinder number and configuration, it will be readily apparent that the invention can be utilized with engines having other cylinder numbers and configurations. Also, although the engine 34 will be described as operating on a two stroke principle, it will be apparent to those skilled in the art that features of the invention also can be employed other engines such as an engine that operates on a four stroke principle. The engine 34 and its components will be described more in detail with reference to FIGS. 3 through 15 later.

In the illustrated embodiment, a jet pump unit 40 propels the watercraft 10. The jet pump unit 40 is mounted within a tunnel or jet pump unit housing 42 formed on the underside of the lower hull section 14. The tunnel 42 is shaped as a duct. An inlet opening of the tunnel 42 is provided at the bottom of the lower hull section 14 and an outlet opening is provided at the aft portion of the lower hull section 14.

A steering nozzle is provided at the outlet opening so as to be rotatable about a vertically extending axis. The steering nozzle is connected to the handle bar 26 with a cable. At the middle portion of the tunnel or duct 42, an impeller of the jet pump unit is placed in an impeller housing 44. The impeller is connected to the engine 34 by means of a driveshaft so as to be driven by the engine 34.

When the impeller is driven, water is induced from the surrounding body of water through the inlet opening and discharged through the outlet opening. At the same time, a certain pressure is produced in the impeller housing 44. The rider may steer the steering nozzle with the handle bar 26 when desires to turn and thereby the discharged water goes in different directions. Thus, the watercraft 10 will turn to the right or left direction that the rider desires.

The details of the construction of the water jet propulsion system and components which are not illustrated may be considered to be conventional or of any type known to those wishing to utilize the invention disclosed herein. Those skilled in the art can readily refer to any known constructions with which to practice the invention.

The engine has an exhaust system 46 which comprises an exhaust manifold 48, an exhaust conduit 50, a water lock 52 and a discharge pipe 54. The exhaust conduit 50 is connected to the water lock 52 by means of a rubber coupling 56. The rubber coupling 56 is provided because the exhaust conduit 50 and the water lock 52 are positioned in different vibration systems relative to each other. The exhaust system 46 is provided for discharging exhaust gasses from combustion chambers of the engine 34 and will be described more in detail with reference to FIGS. 3 through 10 shortly.

A water discharge opening 58 is provided on the port side of the lower hull section 14. Cooling water is discharged through this opening 58 outside as described later. The opening is located under the bow portion 20 in front of the control mast 22. Because of this arrangement, the water discharge is visible by the rider. This is useful for the rider to make sure if the water cooling system described later works well during running.

Referring now primarily to FIGS. 3 through 6, an air induction system, the exhaust system 46 and relationships between them will be described hereunder.

Figure 3:
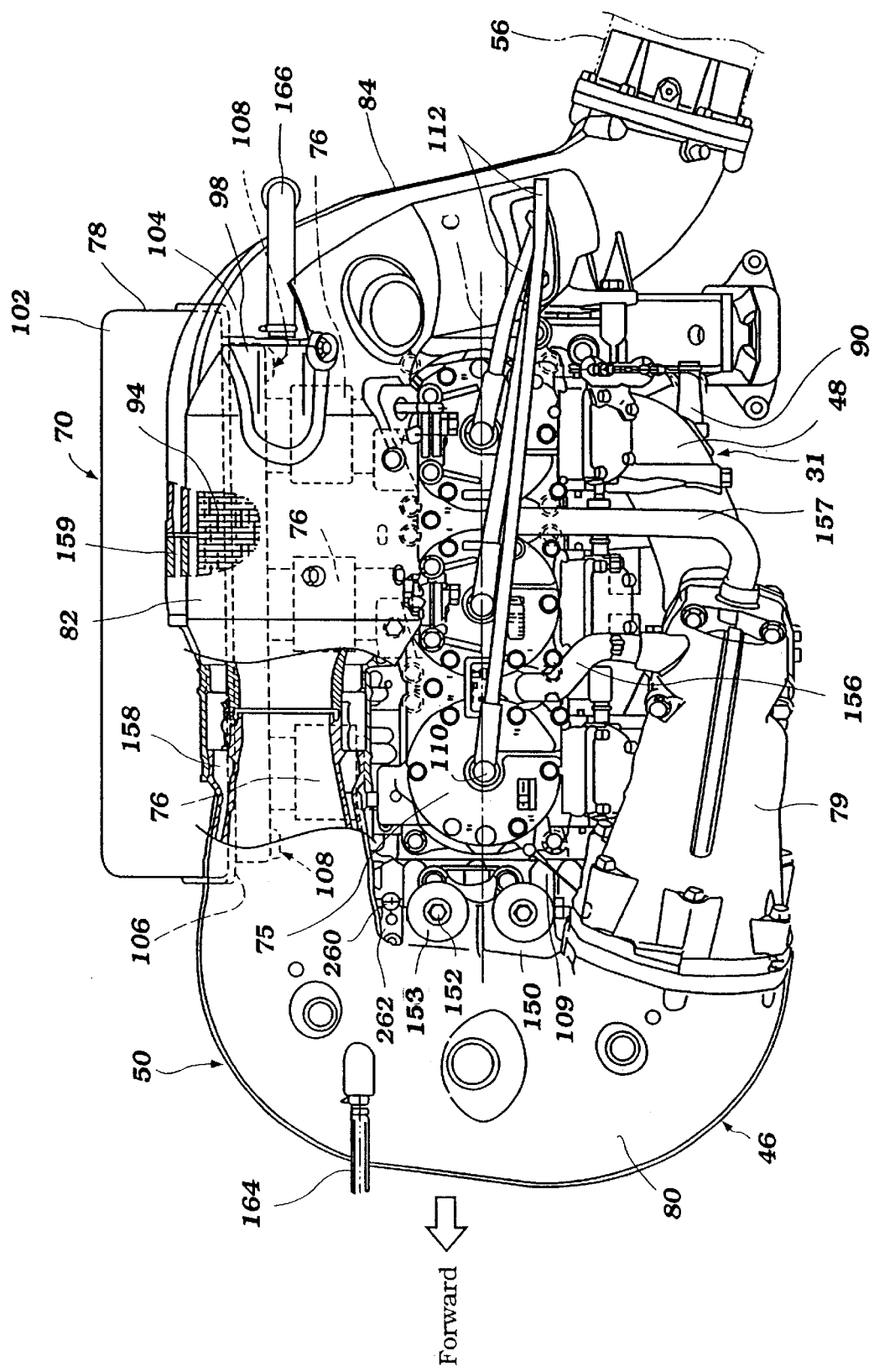
FIGS. 3 through 6 are a plan view, side view, front view and rear view of an engine, respectively, which powers the watercraft.
Figure 4:
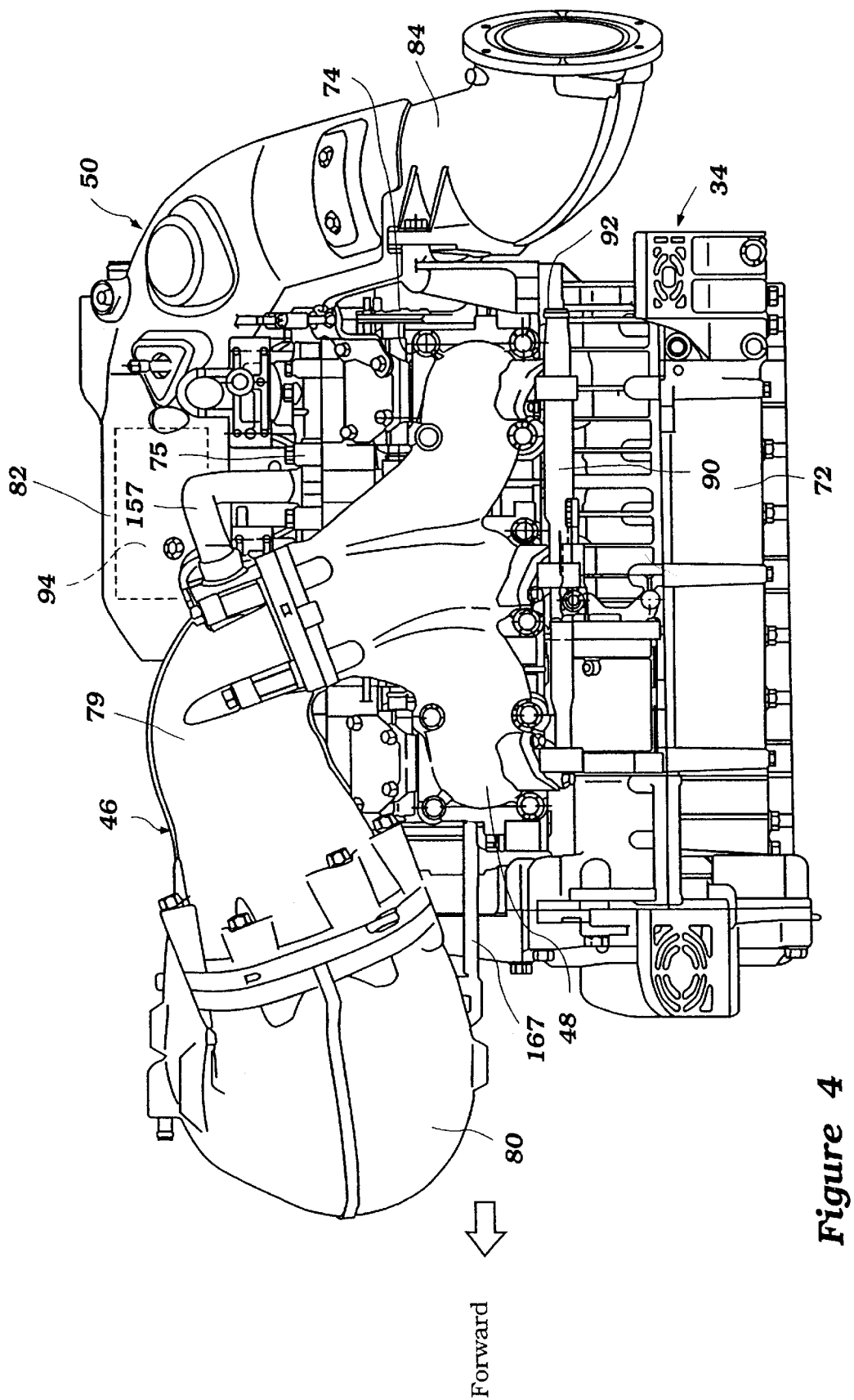
Figure 5:
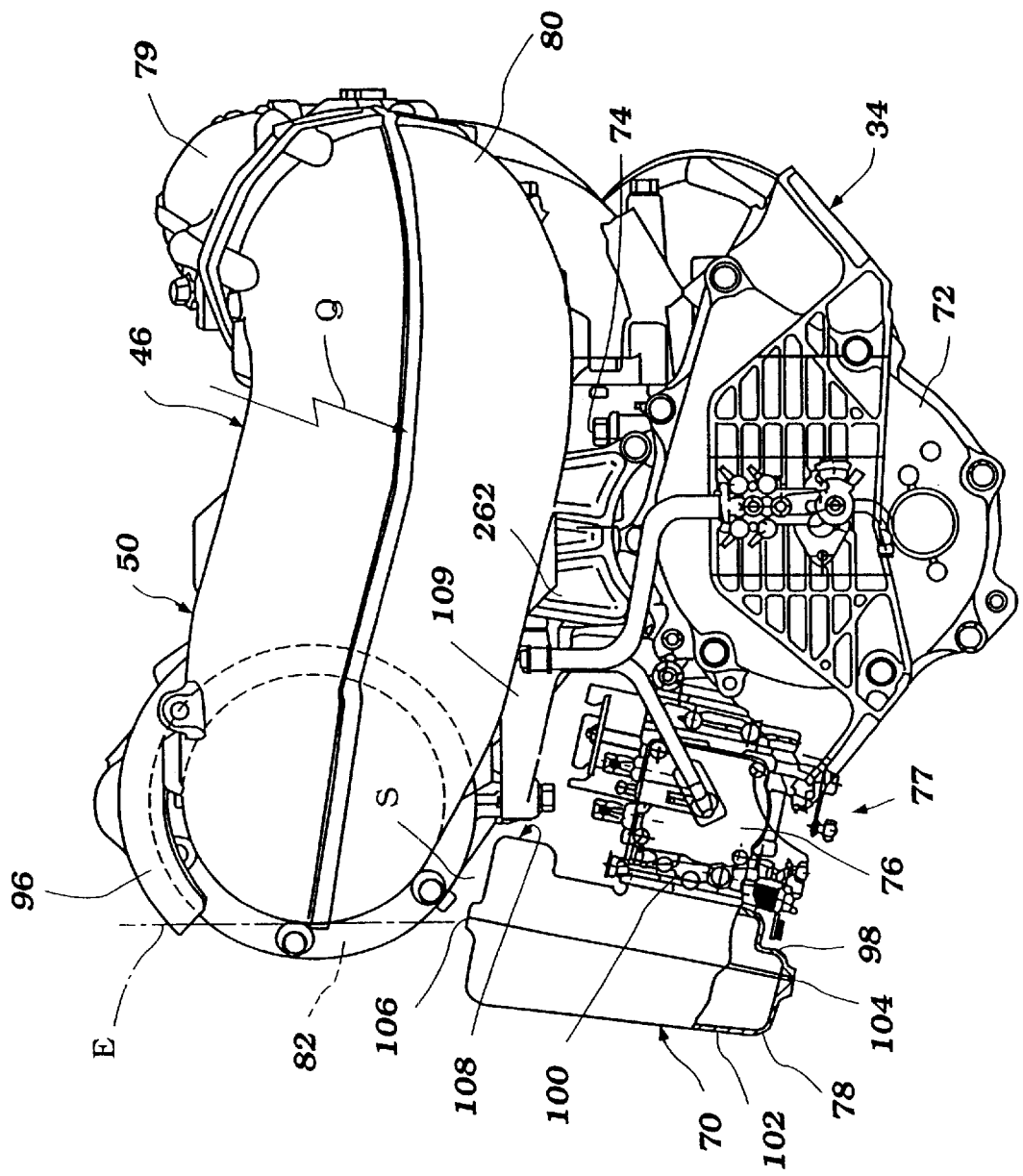
Figure 6:
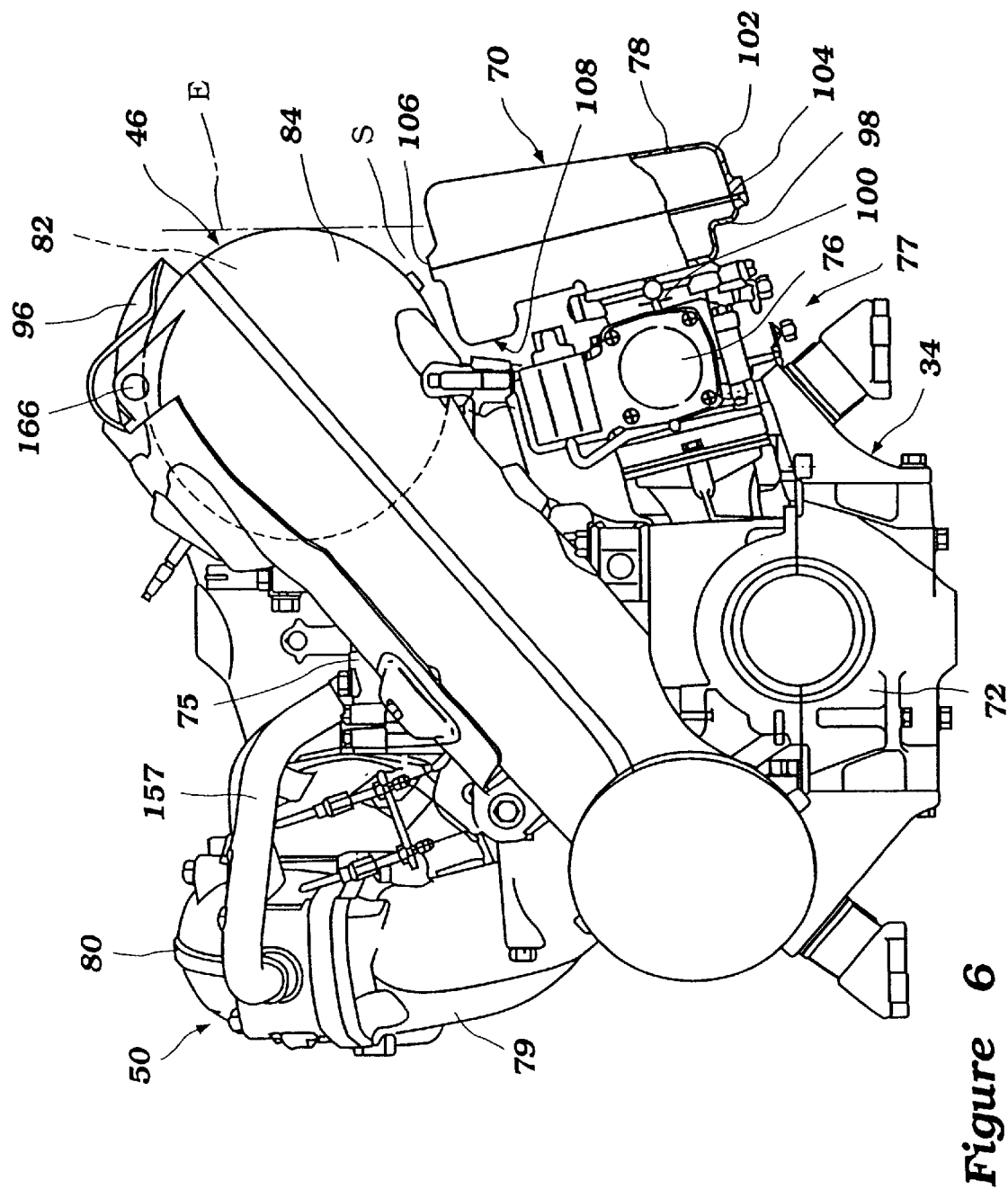

FIGS. 3 through 6 illustrate a plan view, side view, front view and rear view of the engine 34, respectively. FIGS. 3, 5 and 6 show partially cross-sectional views.

The engine 34 includes the air induction system 70 extending from a crankcase 72 to starboard of the watercraft 10 and the exhaust system 46 extending from a cylinder block 74 on the port side of the watercraft 10. The crankcase 72, the cylinder block 74 and a cylinder head assembly 75 are main components which form an engine body of the engine 34. The engine body is generally shaped as a rectangle and three cylinders are disposed therein along its longitudinal axis C. The engine body is generally made of an aluminum casting.

The air introducing system 70 is provided for inducing an air charge into the combustion chamber and includes, as best seen in FIGS. 5 and 6, carburetors 76 and an air silencer or air chamber 78. The carburetors 76 are combined with each other so as to form a carburetor assembly 77. As is well known, the carburetors 76 are also a part of the fuel supply system including the fuel supply tank 36.

As described in outline with reference to FIGS. 1 and 2, the exhaust system 46 includes the exhaust manifold 48, the exhaust conduit 50, the water lock 52 and the discharge pipe 54. The exhaust manifold 48 is connected to respective exhaust ports of the three cylinder bores in the cylinder block 74 to collect exhaust gasses from the cylinder bores. This exhaust manifold 48 extends generally upwardly and inclines forwardly as will be described later. The exhaust system 46 is also generally made of an aluminum casting.

The exhaust conduit 50 comprises four members. A first member is a connecting pipe or contiguous conduit 79 connected to the exhaust manifold 48. The connecting pipe 79 extends generally forwardly along the cylinder block 74 and generally downwardly as going downstream. A second member is a first exhaust expansion chamber 80 connected to the connecting pipe 79. The first exhaust expansion chamber 80 crosses the front and upper portion of the cylinder block 74 and turns to generally rearwardly. As best seen in FIG. 5, the first exhaust expansion chamber 80 is slightly downwardly curved (curvature: Q) so that its total length can be as longer as possible. A third member is a second exhaust expansion chamber 82 connected to the first exhaust expansion chamber 80. The second exhaust expansion chamber 82 extends generally rearwardly further along the opposite side of the cylinder block 76. The rear portion of the first exhaust expansion chamber 80 and the whole part of the second exhaust expansion chamber 82 exist generally in parallel with the longitudinal axis C of said engine body. The fourth member is an exhaust pipe 84 connected to the second exhaust expansion chamber 82. The exhaust pipe 84 is turned at the upper portion of the opposite side portion of the cylinder block 76 to the lower portion slantwise along the rear portion of the cylinder block 76. As a whole, the exhaust conduit 50 generally surrounds the engine body 34. Each of the first and second exhaust expansion chambers 80, 82 has a relatively large volume for attenuating noise by expanding exhaust gasses passing through them.

The water lock 52, as seen in FIGS. 1 and 2 and described above, is connected to the exhaust pipe 84 via the rubber coupling 56. This water lock 52 is primarily a device to prevent water from flowing backward to the exhaust system 46 and secondly the last expansion chamber for exhaust gasses. The exhaust system 46 is completed with the discharge pipe 54. As seen in FIGS. 1 and 2 again, the discharge pipe 54 extends from an upper portion of the water lock 52 upwardly to cross over the jet pump unit 40, then extends downwardly and rearwardly and finally is connected to the impeller housing 42.

A cooling water delivery pipe 90 is affixed to a lower portion of the exhaust manifold 48 and extends longitudinally along the cylinder block 74. An inlet opening 92 of this cooling water delivery pipe 90 is connected to the impeller housing 44 via a supply pipe (not shown) so that the water pressurized in the impeller housing 44 is supplied to the cooling water delivery pipe 90 and then delivered to the water jacket formed in the exhaust manifold 48. The cooling water delivery system will be described in more detail with reference to FIGS. 11 through 13 (A), (B), (C), (D) later.

The second exhaust expansion chamber 82 contains a catalyst 94 in its thick or large body to remove contaminators or toxic emissions. Also, the upper portion of the second exhaust expansion chamber 82 is covered with a cover member 96. There is a relatively large space S almost beneath the second exhaust expansion chamber 82. The air silencer 78 and the carburetor assembly 77 are placed in this space S.

The air silencer 78 is a rectangular box made of synthetic resin and has a relatively large volume to attenuate intake noise. As best seen in FIG. 3, the air silencer 78 is laid along the longitudinal axis C of the cylinder block 76. Also, the upper portion of the air silencer 78 is slightly inclined to the cylinder block 76. The air silencer 78 comprises a first member 98 connected to air ducts 100 of the carburetors 76 and a second member 102 mated with the first member 98 via a gasket 104. The large part of the first member 98 and at least the upper portion of the mating line or face 106 of both members 98, 102 are located under the second exhaust expansion chamber 82. This situation is shown in both FIGS. 5 and 6 with the line E. This line E corresponds to the outermost end of the second exhaust expansion chamber 82. Air inlet openings 108 are provided at a forward end and a rear end of the first member 98 locating above the carburetor assembly 77 to open toward the cylinder block 76. Thus, the inlet opening 108 are positioned completely under the second exhaust expansion chamber 82.

As described above, the seat assembly 24 is removable. When it is removed, the access opening 31 is opened above the engine compartment 32 for engine maintenance. Splash water or the like may enter the engine compartment 32 through this opening 31. Otherwise, when the watercraft 10 is overturned, water can possibly enter the engine compartment 32 also.

Under the circumstances, however, the second exhaust expansion chamber 82 acts as a visor or eaves of the air silencer 78, particularly its mating line 106 and air inlet openings 108. Thus, the water hardly falls onto the air silencer 78 and is prevented from entering there.

In addition, a stay or bracket 109 is located over the carburetor assembly 77. This stay 109 is mounted on the cylinder block 74 of the engine 34 so as to support the bottom portion of the first exhaust expansion chamber 80. Thus, this stay 109 also acts as a visor of the carburetor assembly 77.

Also, the second exhaust expansion chamber 82 should have the bulky or thick body anyhow for containing the catalyst 94 and hence a relatively large dead space S is formed under this chamber 82. Since this space S is utilized for laying the air silencer 78, this silencer 78 can be formed to have large capacity therein. Accordingly, although the engine 34 per se is small or compact, it can be equipped with such a large volume air silencer 78. This large volume silencer 78 is particularly useful for the multiple cylinder engine 34. Because, such a large volume of air charge can be uniformly distributed to respective cylinder bores with ease.

Further, the second exhaust expansion chamber 82 tends to have much heat because it bears the catalyst 94 therein which generates reaction heat. This heat contributes to vaporize the water splashed onto the second exhaust expansion chamber 108. Thus, the water has still less possibility to reach the silencer 78.

Spark plugs 110 are mounted on the cylinder head assembly 75 for respective cylinder bores. Delivery cables 112 are provided for the respective spark plugs 110 for supplying firing energy and also controlling each firing timing. An ignition system, which includes the spark plugs 110 and the delivery cables 112, in this embodiment has an over-revolution control mechanism (not shown). That is, in the event the engine speed exceeds a normal running speed, i.e., when the engine 34 erroneously start to run under an over-revolution condition, the control mechanism stops supplying the firing energy to some of the spark plugs 100 so that they will not be fired and then the engine speed goes down.

Referring now primarily to FIGS. 7 through 10, the configuration of the exhaust system 46 will be described in detail.

Figure 7:
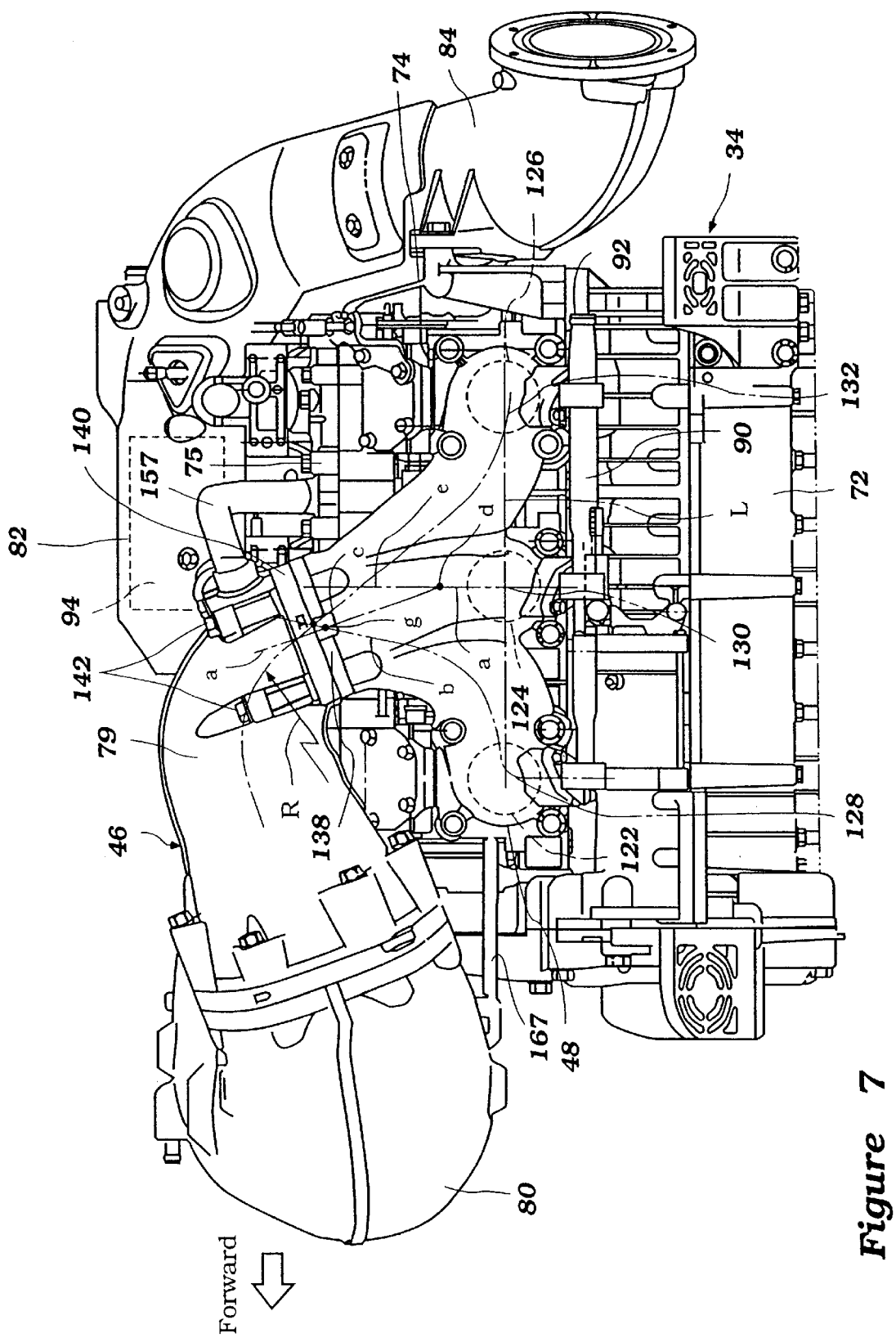
FIG. 7 is almost the same side view of the engine as shown in FIG. 4 except for some indications in connection with relationships among respective exhaust passages in an exhaust manifold and more specifically the junction where three flows of exhaust gasses merge together.
Figure 8:
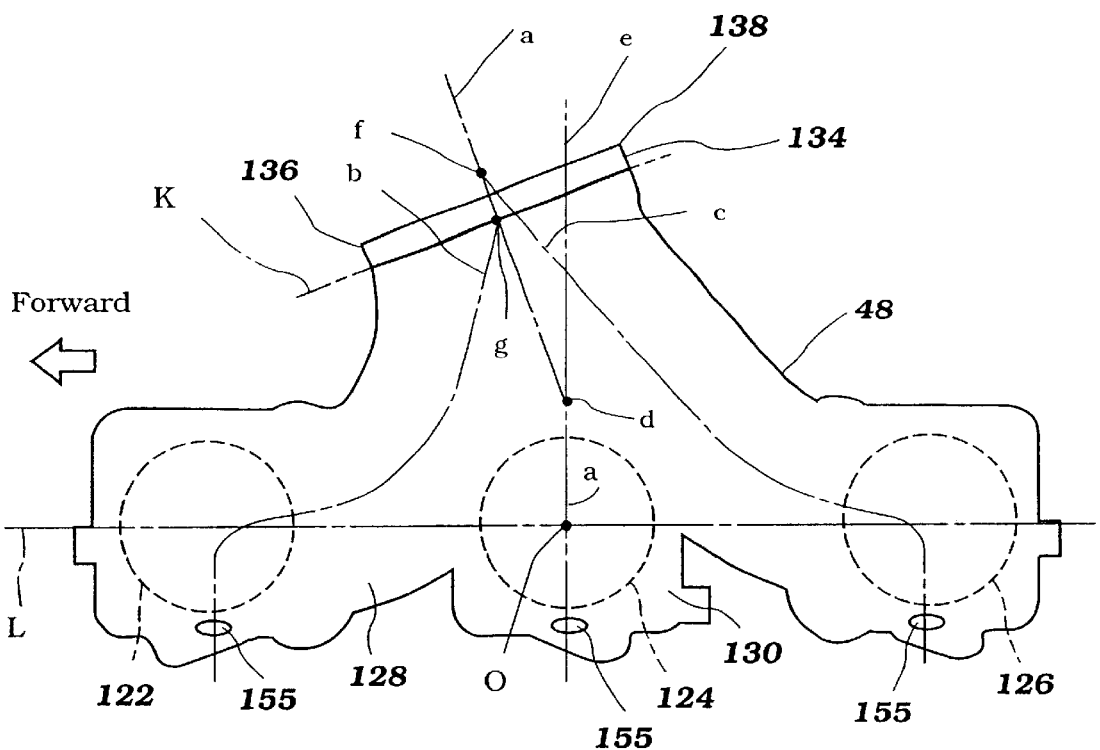
FIG. 8 is an enlarged schematic side view showing the exhaust manifold.
Figure 9:
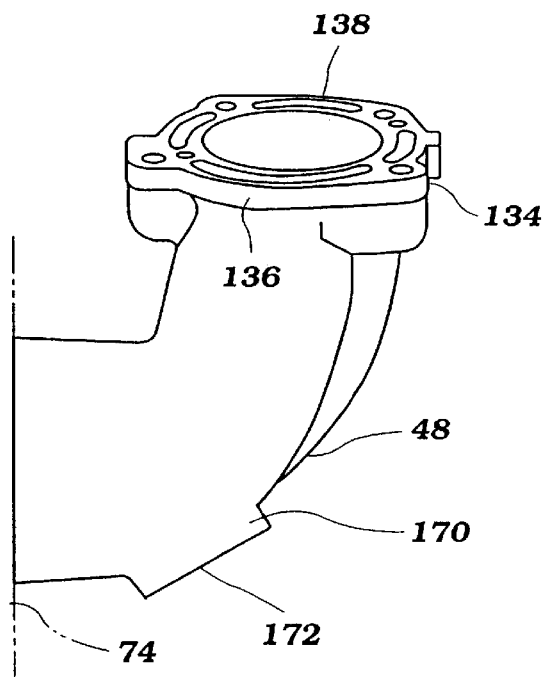
FIG. 9 is also an enlarged front view showing the same exhaust manifold.

FIG. 7 illustrates almost the same side view of the engine 34 as shown in FIG. 4 except for some indications in connection with relationships among respective exhaust passages in the exhaust manifold 48 and more specifically the junction where three flows of exhaust gasses meet with each other. FIG. 8 illustrates schematically an enlarged side view of the exhaust manifold 48. FIG. 9 illustrates also an enlarged front view of the same exhaust manifold 48. The connecting portion to the respective exhaust ports is omitted. In these figures, the same components or members as described in association with the arrangement illustrated in FIGS. 1 through 6 are assigned with the same reference numerals so as to avoid redundancy. Incidentally, the components or members in the other variations and/or embodiments described hereunder will be the same.

Exhaust gasses discharged from respective exhaust ports 122, 124, 126 flow through respective exhaust passages or branches 128, 130, 132 and then merge with each other at the upper portion of the exhaust manifold 48. The exhaust ports 122, 124, 126 are disposed on a line L extending generally horizontally and longitudinally along engine body of the engine 34. The respective exhaust passages 128, 130, 132 have the center axes (a),(b) and (c), respectively. As seen in FIGS. 7 and 8, the center axis (a) of the exhaust passage 130, along which exhaust gasses from the exhaust port 124 flows, inclines forwardly at the point (d) which is on the axis (e) extending perpendicularly. This axis (e) passes also the center (o) of the exhaust manifold 48 and the point (d) is located at almost the medium position of the axis (e).

With this arrangement, the center axis (c) of the exhaust passage 132 is also inclined forwardly. Both of the center axes (a) and (c) merge with each other at the point (f). Meanwhile, both of the center axes (a) and (b) also merge with each other at the point (g). These points (f) and (g) are deviated from each other and the point (g) is lower than the point (f) along the center axis (a).

The exhaust outlet opening or flange portion 134 of the exhaust manifold 48 makes a right angle with the center line (a). In other words, the flange portion 134 is slightly inclined forwardly relative to the perpendicular line (d) and the forward end 136 is positioned lower than the rear end 138. That is, the line K indicating the inclination of the flange portion 134 has a certain angle relative to the line L. Meanwhile, the connecting pipe 79 has a similar flange portion 140 at its inlet opening. Both of the flange portions 134, 140 are jointed with each other by some bolts 142. Although it is not specifically described, the other connecting portions of respective components of the exhaust system 46 have similar flanges and jointed with each other in the same manner.

Since the flange portion 134 of the exhaust manifold 48 is inclined forwardly as described above, the connecting pipe 79 is allowed to extend with a relatively large curvature (R) from the exhaust manifold 48. This configuration contributes to reduction of the whole height of the exhaust system 46 as well as smooth flow of exhaust gasses passing through the connecting portion of the flange portions 134, 140. That is, unless the flange portion 134 would not be inclined forwardly, the connecting pipe 79 should extends more upwardly and the first exhaust expansion chamber 80 should be located at a higher position. Otherwise, the curvature (R) could be smaller and the smooth flow of the exhaust gasses should be prevented. As a result of the present arrangement, the engine 34 can be small or compact and hence the height of the hull 12 will be lowered, while the engine output can be improved.

In addition, the joining points (f) and (g) are deviated with each other. Because of this arrangement, both flows of exhaust gasses coming from the exhaust passages 128, 132 do not collide squarely with each other. Thus, the flows in the manifold 48 per se can go smoothly. This improves the engine output further.

Further, because of the slant flange portion 138 of the exhaust manifold 48, the connecting pipe 79 is allowed to extend generally downwardly as well as forwardly as shown in FIG. 7. This configuration contributes in reduction of protrusion of the first exhaust expansion chamber 80 without decreasing the length and/or capacity of the expansion chamber 80. Thus, the compactness of the engine is more enhanced.

It should be noted that this aspect of the present invention is applicable to other exhaust system arrangements such as, for example, an exhaust system wherein a connecting pipe extends generally rearwardly and another exhaust system wherein whole components are laid upside-down relative to the arrangement in FIG. 7 and described above.

Figure 10:
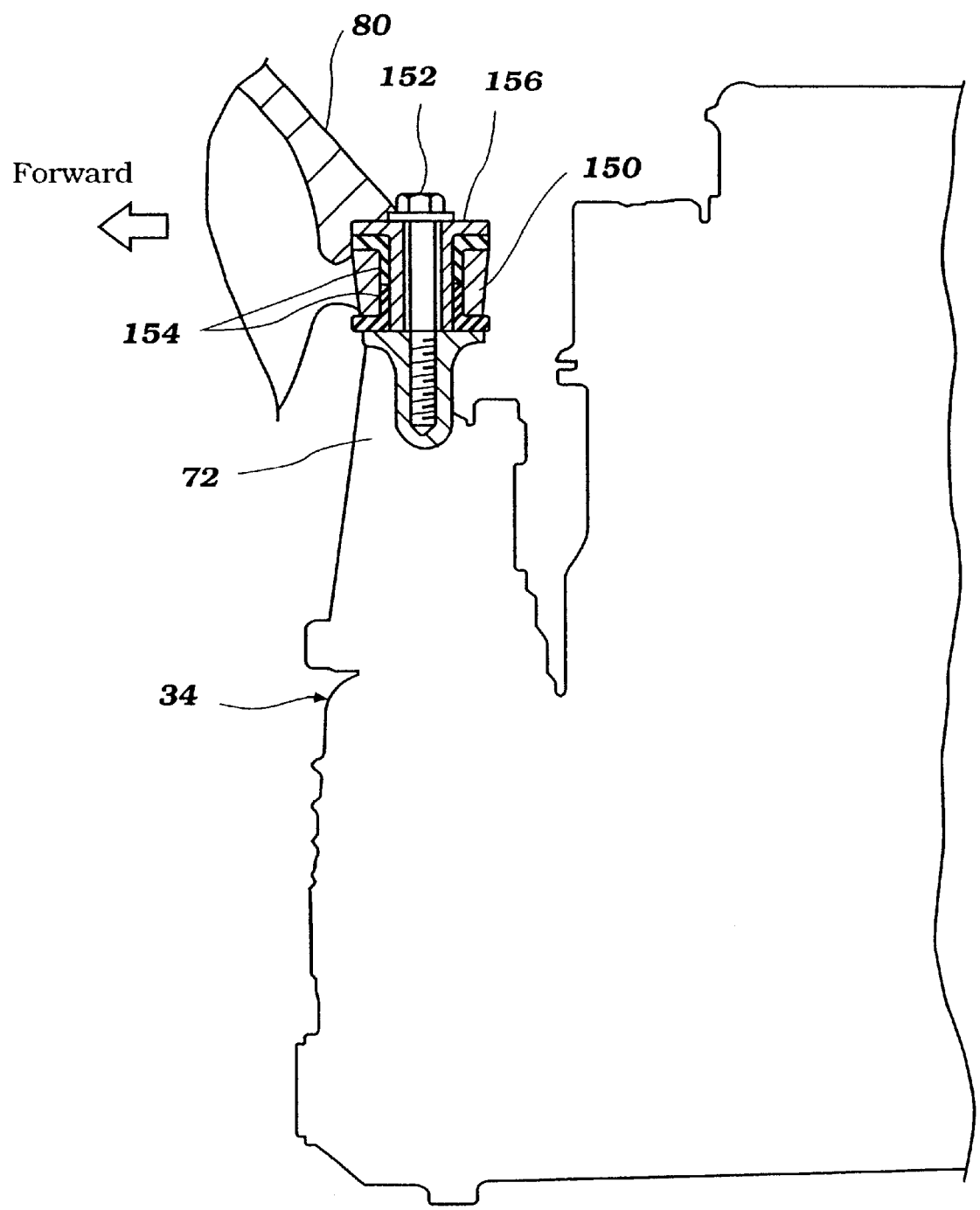
FIG. 10 is a cross-sectional view showing a mounting structure thereby a first exhaust expansion chamber is mounted on a crankcase of the engine.

FIG. 10 illustrates a cross-sectional view showing a mounting structure thereby the first exhaust expansion chamber 13 is mounted on the crankcase 72 of the engine 34.

As seen in this figure and FIG. 3, a brim portion 150 of the first exhaust expansion chamber 13 is fixed to the crankcase 72, at each mounting construction, with a bolt 152 via a pair of rubber mounts 154 and a collar member 153. Because of this mounting construction, vibration generated in the engine 34 can hardly be transmitted to the first exhaust expansion chamber 80. In addition to this advantage, the mounting construction absorbs accumulated tolerances which arises in assembled with the connecting pipe 79 and the second exhaust expansion chamber 82 both are mounted on separate portions.

Referring now primarily to FIGS. 3, 4, 9, 11 through 13(A), (B), (C) and (D), the cooling water supply system will be described in more detail hereunder.

As described above, the cooling water delivery pipe 90 is affixed to a lower portion of the exhaust manifold 48. The delivery pipe 90 is arranged to deliver cooling water pressurized in the impeller housing 44 to the exhaust system 46 and engine components such as the cylinder block 74 and the cylinder head assembly 75. The cooling water is delivered at fist a water jacket 155 (see FIGS. 8 and 11) in the exhaust manifold 48 and sent to respective water jackets (not shown) in the cylinder block 74 and the cylinder head assembly 75. Then, the cooling water is supplied to the connecting pipe 79 through a couple of branch pipes 156, 157 which extend between two adjoining cylinders. The cooling water is, next, delivered to respective water jackets 158, 159 (FIG. 3) in the first and second exhaust expansion chambers 80, 82 and then sent to a water jacket (not shown) of the discharge pipe 84. While passing through those water jackets, the cooling water takes heat away from the engine and exhaust system components. After that, the cooling water is supplied inside of the discharge pipe 84 upstream of the rubber coupling 56 and mixed with exhaust gasses to cool them down. Finally, the water is discharged from the impeller housing 42 outside of the watercraft 10 with the exhaust gasses.

Although not shown the water jackets of the exhaust manifold 48 and the connecting pipe 79 are partitioned with a gasket. However, since the gasket has a small aperture, some of the cooling water in the water jacket of the exhaust manifold 48 can pass through the small aperture with air deposited there and goes to the water jacket of the connecting pipe 79.

A discharge hose 164 (see FIG. 3) extends out from the water jacket 158 in the first exhaust expansion chamber 80. This discharge hose 164 is connected to the water discharge opening 58 (see FIG. 1) and some of the cooling water is sent through the discharge hose 164 and discharged form the water discharge opening 58 so that the rider can confirm the cooling system works properly as described above.

Also, a discharge conduit 166 (see FIG. 3) is provided for discharging some part of cooling water outside of the watercraft 10 from the water jacket 159 in the second exhaust expansion chamber 82. This discharge conduit 166 is connected to the water jacket 159 at a portion of the water jacket 159 which is located immediately downstream of the catalyst 94.

Further, a drain conduit 167 (see FIG. 4) is provided between the water jacket 158 in the first exhaust expansion chamber 80 and the water jacket in the exhaust manifold 48 for draining the water that can deposit at the lowermost portion of the water jacket 158. This drain conduit 167 is slightly inclined rearwardly. Because of this drain conduit 167, water will not deposit there and hence rust of the first exhaust expansion chamber 80 is well prevented. The water drained into the water jacket of the exhaust manifold 48 will be discharged outside of the watercraft 10 through the cooling water delivery pipe 90, the supply pipe (not shown) and the impeller housing 44 when the engine 34 is stopped.

Figure 11:
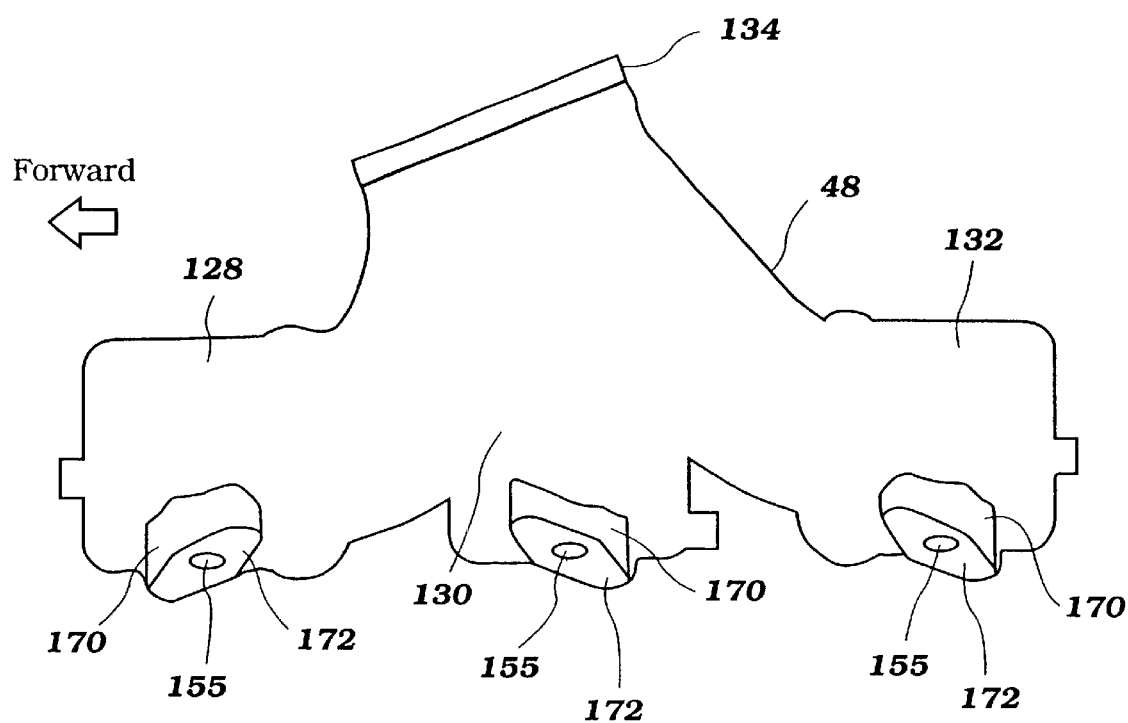
FIG. 11 is an enlarged schematic side view, almost similar to FIG. 8, of the exhaust manifold showing bosses where a cooling water delivery pipe is affixed.
Figure 12:
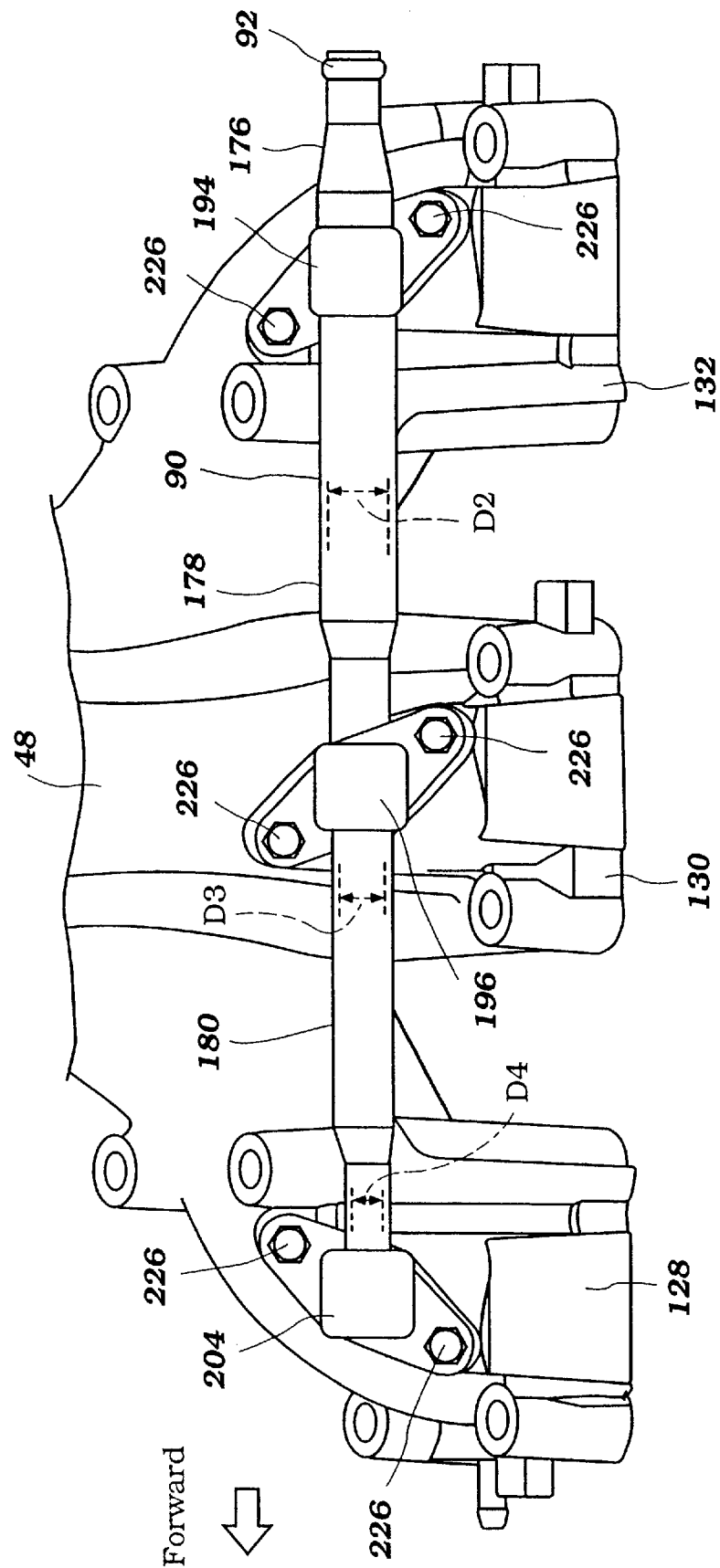
FIG. 12 is an enlarged partial side view showing the exhaust manifold which has the cooling water delivery pipe mounted on the bosses.

FIG. 11 illustrates an enlarged schematic side view, almost similar to FIG. 8, of the exhaust manifold 48 showing bosses 170 where the cooling water delivery pipe 90 is affixed. FIG. 12 illustrates an enlarged, partial side view showing the exhaust manifold 48 which has the cooling water delivery pipe 90 mounted on the bosses 170. FIGS. 13(A), (B) and (C) illustrate the cooling delivery pipe 90 in detail. FIG. 13(A) is a front view thereof. FIG. 13(B) is a cross-sectional side view thereof. FIG. 13(C) is a cross-sectional view thereof, taken along the line C—C in FIG. 13(A).

The exhaust manifold has three exhaust passages or branch portions 128, 130, 132 corresponding to three cylinder bores as described above. The bosses 170 are formed at respective inlet end portions of the exhaust passages 128, 130, 132. The bosses 170 has mating faces 172 where the cooling water delivery pipe 90 is mounted. There is the water jacket 155 in the exhaust manifold 48, as aforedescribed, which are divided three branch jackets therein. The respective branch jackets open at the bosses 170. Although it is not shown, each boss 170 has a pair of bolt holes at both sides of the inlet opening of the water jacket 155.

The cooling water delivery pipe 90 is made of metal such as aluminum or a rigid synthetic resin. The delivery pipe 90 comprises generally three separated tubular sections 176, 178, 180 (FIG. 3) in. The first section 176, which is located at the most upstream portion, has the shape wherein an inner diameter D1 at a portion in the proximity to the inlet opening 92 is less than an inner diameter D2 at a portion 182 downstream of the inlet opening 92. The second section 178 continuing the first section 176 has the shape wherein the diameter D2, which is the same as the inner diameter D2 of the first section 176, at a portion 184 is greater than the inner diameter D3 at a portion 186 downstream of the portion 184. The third section 180, in turn, has the shape wherein the inner diameter D3, which is the same as the inner diameter D3 of the second section 178, at a portion 188 is greater than the inner diameter D4 at a portion 190 downstream of the portion 188. That is, the sections 176, 178, 180 are formed so that they have diameters which will generally shrink as going downstream except the inner diameters in the first section 176 (D2>D3>D4). Although there are tapered segments 192 between the respective portions 92, 182 to 190 in this embodiment, they can be omitted.

The first and second tubular sections 176, 178 are connected with each other by means of a first bracket 194, while the second and third tubular sections 178, 180 are connected with each other by means of a first bracket 196. These brackets 192, 194 are formed to have tubular configurations, one end of which is closed and the other end is opened. Through the bodies of the brackets 192, 194 and in normal to the longitudinally axes thereof, apertures 202 are provided. Also, at each open end of the brackets 192, 194, a flange portion 198 having bolt holes 200 is formed.

Thus, after the tubular sections 176, 178, 180 are inserted into the respective apertures 202 of the brackets 194, 196, each of them are welded to each other so that they are connected water-tightly. Meanwhile, another bracket 204 is provided. The bracket 204 has the almost same configuration as the brackets 192, 194 except that it has only one aperture 203. The other end of the tubular section 180 is inserted into the aperture 203 of the bracket 204 and welded thereto also.

The respective brackets 194, 196, 204 have different length so that their mating faces 206 can be on the same plane 208. Thus, the cooling water delivery pipe 90 is completed wherein a main water passage 210, branch passages 212, 214, 216 and outlet openings 218, 220, 222 are provided.

Figure 13D:
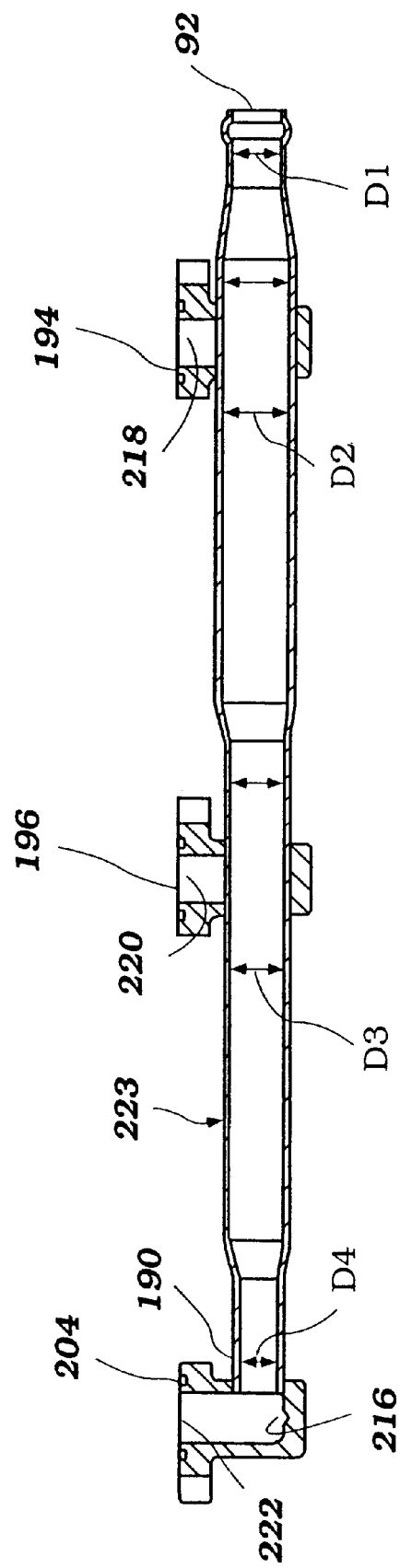
FIG. 13(D) is a cross-sectional view of a variation of the cooling delivery pipe.

Although the separate tubular sections 176, 178, 180 are used in this embodiment, a single pipe 223 shown in FIG. 13(D) that has the same configuration is applicable. Also, the tubular sections and brackets can be integrated and made of a synthetic resin molding.

The delivery pipe 90 assembled as described above is mounted on the bosses 170 formed at the lower portion of the exhaust manifold 48. That is, the mating faces 206 of the brackets 194, 196, 198 are positioned to meet with the mating faces 172 of the bosses 170 and also the outlet openings 218, 220, 222 are positioned to meet with the respective water jackets 155 in the exhaust manifold 48. Then, the flange portions 198 of the brackets 194, 196, 198 are affixed to the bosses 172 with bolts 226 via O rings 228.

As described above, cooling water is pressurized in the impeller housing 44 and this pressurized water is supplied to the cooling water delivery pipe 90. In the meantime, however, the cooling water delivery pipe 90 is so formed that its diameter shrinks as going downstream. Accordingly, the water flowing through the outlet opening 220 in the middle bracket 196 is faster than the water flowing through the outlet opening 218 in the upstream bracket 194. In the same way, the water flowing through the outlet opening 222 in the downstream bracket 204 is faster than the water flowing through the outlet opening 220 in the middle bracket 196. As a result, the respective amounts of the cooling water supplied from the outlet openings 222 to the branch jackets 155 of the exhaust manifold 48 are almost the same relative to each other. In other words, cooling water is uniformly divided to each branch jacket 155 in the exhaust manifold 48.

Also, the unified single delivery pipe 90 is embodied in this embodiment. In addition, this pipe 90 is rigid. Accordingly, it is quite easy to affix the delivery pipe 90 to the exhaust manifold 48. Further, the rigid pipe 90 contributes in enhancing stiffness of the respective exhaust passages 128, 130, 132 of the exhaust manifold 48.

Figure 14:
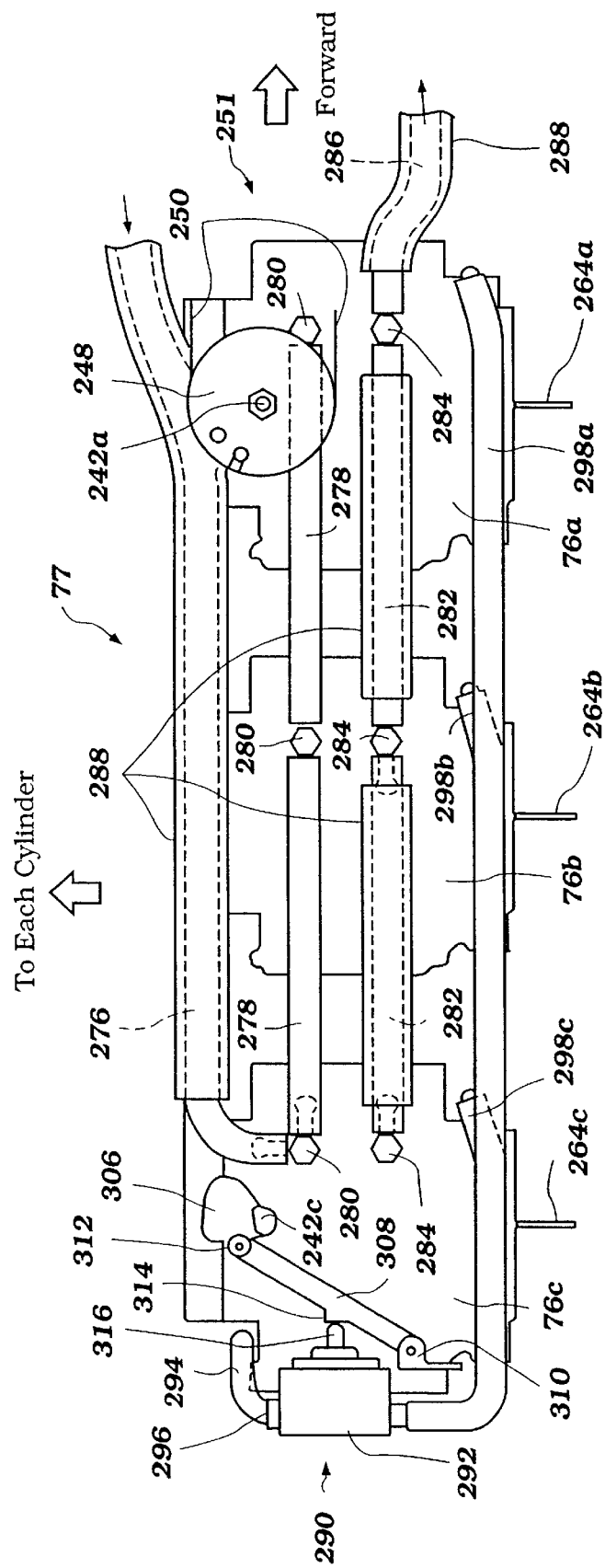
FIG. 14 is an enlarged top plan view showing a carburetor assembly.
Figure 15:
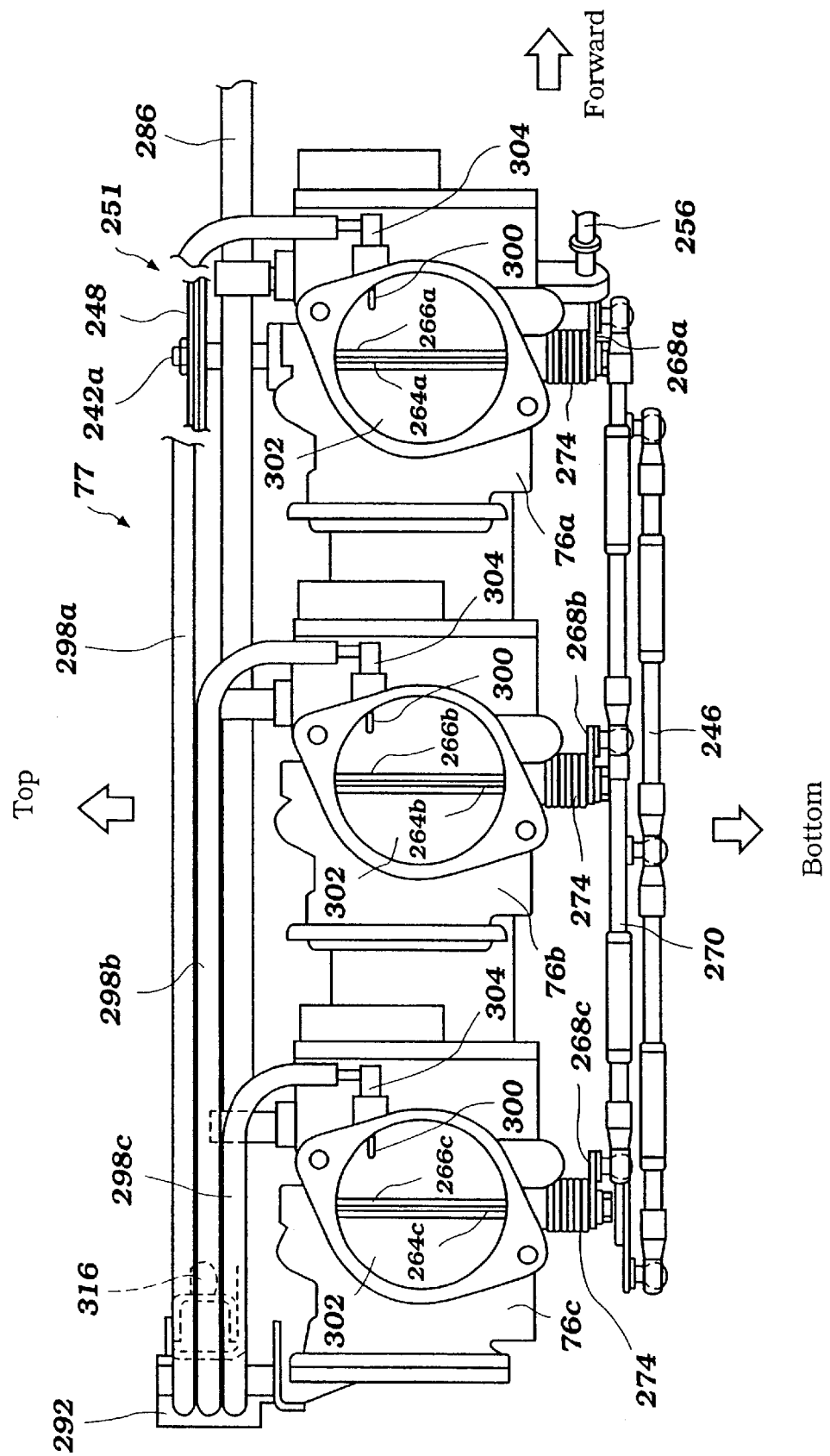
FIG. 15 is an enlarged side elevational view showing the same carburetor assembly.
Figure 16:
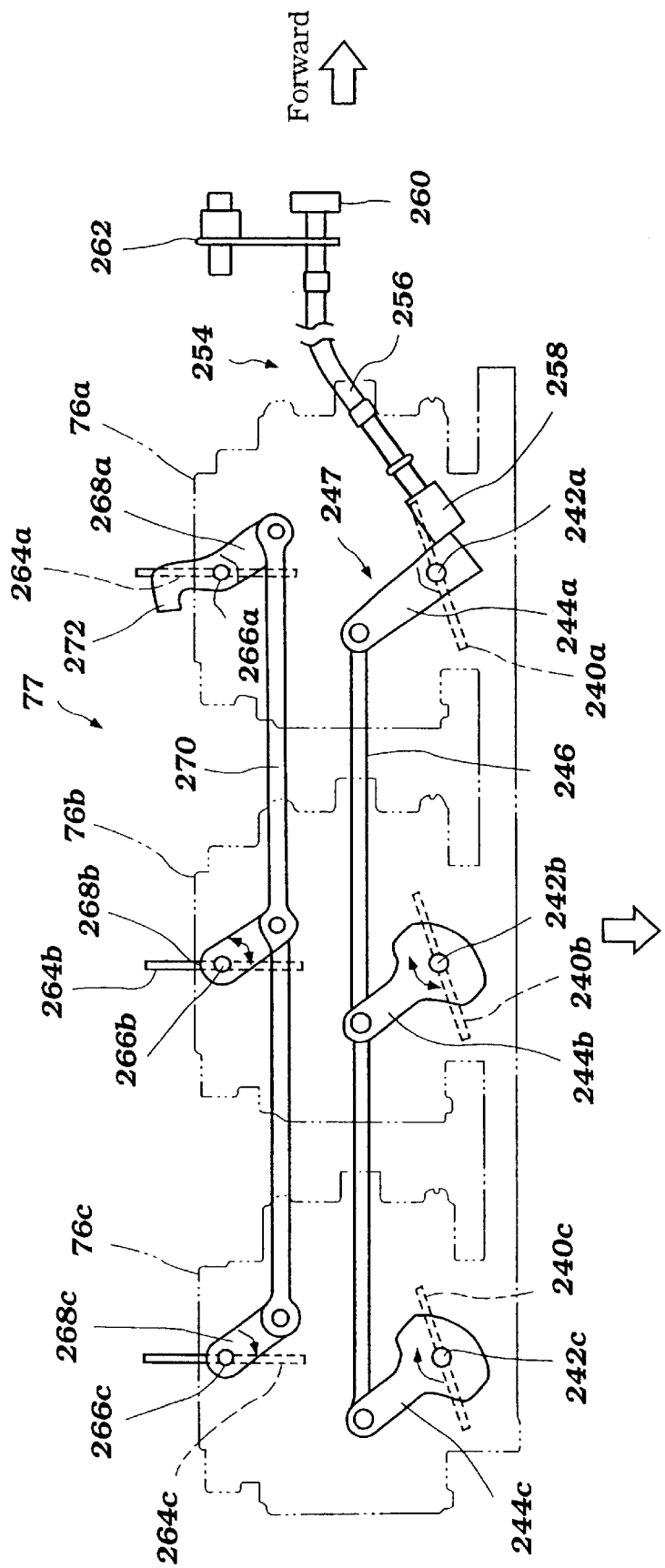
FIG. 16 is an enlarged bottom plan view showing still the same carburetor assembly and the carburetor bodies are shown in phantom.

Referring now primarily to FIGS. 14 through 16, the carburetor assembly 77 will be described more in detail hereunder.

FIG. 14 illustrates an enlarged top plan view of the carburetor assembly 77. FIG. 15 illustrates an enlarged side elevational view thereof. FIG. 16 illustrates an enlarged bottom plan view thereof and shows carburetor bodies in phantom.

As seen in FIG. 16, throttle valves 240a,b,c are supported on throttle valve shafts 242a,b,c that are rotatably mounted on the respective carburetors 76a,b,c. With the rotation of the valve shaft 242a, for example, an opening of the throttle valve 240a is changed and a certain amount of air charge corresponding to the opening is induced into the carburetor at every operational cycle of the engine 34. When the air charge passes through the throttle valve 240 a certain amount of fuel is drawn out by venturi effect and mixed with the air charge, then supplied to each combustion chamber. This is conventional and well known to those skilled in the art. Thus, no further description seems to be necessary in connection with functions of the throttle valves 240a,b,c.

On the bottom side of the carburetors 76a,b,c, throttle levers 244a,b,c are affixed at respective ends of the valve shafts 242a,b,c for rotating them. These throttle levers 244a,b,c are linked together by means of a connecting rod 246 to be operated simultaneously. The throttle levers 244a,b,c and the connecting rod 246 form an interlocking mechanism 247.

The valve shaft 242a located at the most forward position passes through the body of the carburetor 76a and protrudes to the other side, i.e., the top of the carburetor 76a. A pulley 248 is affixed to the end of this other end of the valve shaft 242a and a control wire 250 is wound around the pulley 248. The pulley 248 and the control wire 250 forms a control mechanism 251. This control wire 250 is connected to the throttle control lever 28 placed at the handle bar 26 (see FIG. 2). The throttle valves 240a,b,c are closed by means of coil springs (not shown) unless the rider operates the throttle control lever 28. When the rider operates the throttle control lever 28, the control wire 250 is pulled and thereby the pulley 248 is rotated. With this rotation of the pulley 248, as noted above, the throttle valve 240a, which is directly fixed to the valve shaft 242a, is rotated to open. At the same time, the other throttle valves 240b,c are also rotated and opened because the entire throttle levers 244a,b,c are linked together by the connecting rod 246.

It should be noted that the pulley 248 and the control wire 250 can be replaced by other connection measures such as levers and gears.

In order to adjust an idling opening of the throttle valves 240a,b,c, an idling adjustment mechanism 254 is provided. This adjuster 254 includes a push-pull cable (Boden wire) 256, a push head 258 and an adjusting screwhead 260. The push-pull cable 256 is conventional and comprises an inner cable and an outer cable (both are not shown). One end of the outer cable is fixed at the body of the carburetor 76a, while the other end is fixed to a plate 262 that is formed at the stay 109 that supports the first exhaust expansion chamber 80 (see FIGS. 3 and 5). The adjusting screwhead 260 is disposed at the same plate 262. The plate 262 is placed at a relatively high location in the engine compartment 32. Thus, as best seen in FIG. 3, the adjusting screwhead 260 fronts upwardly between the cylinder head 75 and the first exhaust expansion chamber 80. Because of this arrangement, the adjusting screwhead 260 is accessible when the seat assembly 24 is removed. Since the outer cable and the inner cable are connected with a screw connection, with rotation of the adjusting screwhead 260, the push head 258 moves reciprocally.

The push head 258 regulates a position of the throttle lever 244a, which is disposed at the most forward carburetor 76a. This regulated position corresponds to the idling opening of the throttle valve 240a. Thus, the reciprocal movement of the push head 258 can adjust the idling opening of the throttle valve 240a. The idling opening is usually adjusted to be an almost closed position, although depends on environmental situations including external temperature. Since the throttle levers 244a,b,c are linked together with the connecting rod 246, when the opening of the throttle valve 240a is adjusted, the openings of the other throttle valves 240b,c are also adjusted at the same idling opening.

As described above, the positions of the throttle levers 244a,b,c are regulated by the idling adjustment mechanism 254 in this embodiment. However, other members are of course applicable instead of the throttle levers 244a,b,c inasmuch as the members are operable by means of the idling adjustment mechanism 254.

In the meantime, choke valves 264a,b,c are provided upstream of the respective throttle valves 240a,b,c in the carburetors 76a,b,c. As is also well known, these choke valves 264a,b,c are members for reducing an air amount at the start-up of the engine 34 so as to increase a fuel amount mixed with the air charge and thereby ensure an stable operation of the engine 34 immediately after the engine start. The choke valves 264a,b,c are supported on choke valve shafts 266a,b,c which are rotatably affixed on the bodies of the carburetors 76a,b,c. At the end of the choke valve shafts 266a,b,c on the bottom side of the carburetors 76a,b,c, choke valve levers 268a,b,c are mounted and these choke valve levers 268a,b,c are linked together by means of a connecting rod 270. The choke valve lever 268a, which is disposed at the most forward carburetor 76a has a manually operated section 272 at the choke valve lever 268a. Not like the throttle valves 240a,b,c, the choke valves 264a,b,c are opened by means of coil springs 274 unless the rider operates the manually operated section 272 of the choke valve lever 268a. When the rider operates the manually operated section 272, the choke valve 264a is rotated to close. At the same time, the other choke valves 264b,c are also rotated and closed because the entire choke levers 268a,b,c are linked together by the connecting rod 270. It is practicable to connect a control cable at the choke valve lever 268a instead of the manually operated section 272 so that the lever 268a is operable remotely.

On the top side of the carburetor assembly 77 (FIG. 14), a fuel supply duct 276 is disposed. The fuel supply duct 276 is connected to the fuel supply tank 36 which is placed in the hull 12 (see FIGS. 1 and 2). The fuel supplied through the fuel supply duct 276 for the fuel supply tank 36 are delivered to the respective carburetors 76a,b,c through delivery ducts 278 and delivery units 280.

Collection ducts 282 are laid in parallel to the delivery ducts 278. Also, collection units 284 and a fuel return duct 286 are provided and surplus fuel are returned to the fuel supply tank 36 through the collection units 284, the collection ducts 282 and the fuel return duct 286.

Although not so often, air may enter the carburetors 76a,b,c through the fuel supply duct 276 and the delivery ducts 278. However, since the collection units 282 and the collection ducts 282 are positioned at the top side of the carburetor assembly 77 in this embodiment, such air can easily escape through the collection ducts 282 and the fuel return duct 286. Incidentally, the fuel supply duct 276, the collection ducts 282 and the fuel return duct 286 are covered with protection tubes 288.

In addition to the components described above, an acceleration pump mechanism or fuel increase mechanism 290 is disposed on the top side of the carburetor assembly 77, specifically the carburetor 76c which is located at the most rearward position. The acceleration pump mechanism 290 includes an acceleration pump 292. A fuel supply pipe 294 is connected to the pump 290 via a check valve 296. The fuel supply pipe 294 is connected to the fuel supply tank 36 in the hull 12 also. The check valve 296 allows the flow of fuel from the fuel tank 36 to the pump 290 but prevents the reverse flow.

Along the top edge of the carburetor assembly 77, acceleration fuel supply pipes 298a,b,c are disposed, all of which are connected to the acceleration pump 292. The respective fuel supply pipes 298a,b,c are connected to injection nozzles 300, which open to respective air passages 302 of the carburetors 76a,b,c, via respective check valves 304. The check valve 304 allow the flow of fuel from the pump 292 to the nozzles 300 but prevent the reverse flow.

A cam 306 is supported on the valve shaft 242c of the carburetor 76c which is located at the most rearward position. Meanwhile, a pump lever 308 is rotatably supported on a fulcrum 310 affixed to the body of the carburetor 76c. The tip portion 312 of the pump lever 308 contacts the cam 306 and a middle portion thereof has a projection 314 which contacts a pump rod 316. The pump rod 316 is provided on the acceleration pump 292 and the pump 292 will supply fuel to the fuel supply pipes 298a,b,c with rapid activation of the pump rod 316.

When the rider operates the throttle control lever 28 (FIG. 2) slowly, the valve shaft 242c and then the cam 306 are also slowly rotated. With this slow rotation of the cam 306, the pump lever 308 slowly pushes the pump rod 316. In this operation, no fuel is supplied from the pump 292. Meanwhile, when the rider operates the throttle lever 28 quickly because the rider desires to accelerate the watercraft 10, the valve shaft 242c and then the cam 306 are also quickly rotated. With this rapid rotation of the cam 306, the pump lever 308 rapidly pushes the pump rod 316. In this acceleration operation, fuel is supplied from the pump 292 to the supply pipes 298a,b,c. The fuel is injected to the air passages 302 of the respective carburetors 76a,b,c. Accordingly, the amount of fuel supplied under the acceleration condition is properly increased.

Usually, fuel is always supplied to the acceleration pump 292 during the engine operation and remains there after the stop of the engine operation. However, for some reasons, fuel in the fuel tank 36 may be removed. Under the condition, even though the fuel is refilled in the tank 36, fuel is hardly supplied by the acceleration pump 292 because there is time lag before the fuel reach the fuel pump 292 and accumulate therein. During this time, the acceleration pump mechanism 290 may not provide any or a proper amount of acceleration fuel to the carburetors 76a,b,c.

However, because of the check valve 296 at the acceleration pump 292 and the other check valves 304 at the injection nozzles 300, after removing the fuel from the fuel tank 36, some fuel may remain in the acceleration pump 292 and also the fuel supply pipes 298a,b,c. As a result, the acceleration pump mechanism 290 in this embodiment is allowed to supply acceleration fuel to the carburetors 76a, b,c even immediately after the fuel tank 36 is refilled with fuel.

The aforedescribed fuel acceleration pump mechanism 290 is disposed on the carburetor 76c which is located at the most rearward position of the carburetor assembly 77. In the meantime, when the small watercraft 10 accelerates, its bow portion is slightly lifted up or trimmed up. The arrangement of the pump mechanism 290 and together with this position of the watercraft 10 under the acceleration condition, air or bubble in the fuel supply pipes 298a,b,c, if any, may be pushed upwardly and easily discharged to the carburetor bodies 76a,b,c through the nozzles 300. This brings in a good response of the next acceleration operation.

Also, because of the arrangement wherein the acceleration pump mechanism 290 is placed at the top and most rearward position of the carburetor assembly 77, the layout including the fuel supply duct 276, the delivery ducts 278, the collection ducts 282, the fuel return duct 288 and the acceleration fuel supply pipes 298a,b,c is easier and neater than other arrangements.

As described above, the throttle levers 244a,b,c and the connecting rod 246 are located at the bottom of the carburetor assembly 77, where it is shaded by the carburetor bodies 76a,b,c relative to the second exhaust expansion chamber 82 which can have much heat during the engine operation. Accordingly, the throttle levers 244a,b,c and the connecting rod 246 are not directly influenced by the heat and hence heat expansion of them, which may cause errors in operations of the throttle levers 244a,b,c, will be well precluded.

Despite of the abovenoted arrangement of the throttle levers 244a,b,c and the connecting rod 246, the pulley 248 is positioned at the top of the carburetor 76a. Thus, it can provide very good accessibility for the work to wind the control wire 250 around the pulley 248. In addition, although the push head 258 of the idling adjustment mechanism 254 is positioned at the bottom of the carburetor 76a, its operational member, i.e., the adjusting screwhead 260 is positioned at the plate 262 of the stay 109 that is placed at a relatively higher position of the engine 34 via the push-pull cable 256 and fronts upwardly. The rider of the watercraft 10 may have good access there when removes the seat assembly 24. Thus, the accessibility to such members is not hindered.

Further, since the pulley 248 as the interlocking mechanism is disposed at one side of the carburetor assembly 77 and the throttle levers 244a,b,c as well as the connecting rod 246 are disposed at the other side thereof, no interference between them in location occurs. This results in compactness of the carburetor assembly 77.

It should be noted that the features of this invention described above can be applicable other watercrafts such as a jet boat.

Of course, the foregoing description is that of preferred embodiments of the invention, and various changes and modifications may be made without departing from the spirit and scope of the invention, as defined by the appended claims.

What is claimed is:

1. A watercraft comprising a hull and a propulsion device carried by said hull and driven by an engine disposed in the hull for propelling said watercraft, said engine comprising an engine body having at least one combustion chamber, an air induction system extending from said engine body for introducing air charge into said combustion chamber, and an exhaust system extending from said engine body for discharging exhaust gasses from said combustion chamber, said air induction system including an air chamber, said exhaust system including a catalyst device in the proximity of said engine body, and said air chamber of said air induction system, at least in part, being placed under said catalyst device of said exhaust system.

2. A watercraft as set forth in claim 1 wherein said passage portion of said exhaust system includes an expansion chamber for expanding the exhaust gasses.

3. A watercraft as set forth in claim 1 wherein said air chamber includes a first member and a second member mated with said first member, a mating portion is formed between both the first and second members, and said mating portion, at least in part, is placed under said passage portion of said exhaust system.

4. A watercraft as set forth in claim 1 wherein said engine body has a plurality of sides, said exhaust system extends from one side of said engine body and generally surrounds said engine body, and said air induction system extends from another side of said engine body.

5. A watercraft as set forth in claim 1 wherein engine body is generally shaped as a rectangle having a longitudinal axis, and said passage portion of said exhaust system extends generally in parallel to the longitudinal axis of said engine body.

6. A watercraft as set forth in claim 1, wherein said exhaust system comprises a manifold including a merging portion in which the plurality of passages gradually merge together to define the outlet, the merging portion being curved.

7. A watercraft comprising a hull and a propulsion device carried by said hull and driven by an engine disposed in the hull for propelling said watercraft, said engine comprising an engine body having at least one combustion chamber, an air induction system extending from said engine body for inducing air charge into said combustion chamber, and an exhaust system extending from said engine body for discharging exhaust gasses from said combustion chamber, said air induction least in part, being placed under said passage portion of said exhaust system, wherein said exhaust system includes an exhaust conduit extending from said engine body and having an opening end, and a contiguous conduit connected to said opening end and extending generally along said engine body in one direction, said opening end has an end surface extending generally normal to an axis of the exhaust conduit, and the end surface inclines toward the direction in which said contiguous conduit extends.

8. A watercraft comprising a hull and a propulsion device carried by said hull and driven by an engine disposed in the hull for propelling said watercraft, said engine comprising an engine body having at least one combustion chamber, an air induction system extending from said engine body for introducing air charge into said combustion chamber, and an exhaust system extending from said engine body for discharging exhaust gasses from said combustion chamber, said air induction system including an air chamber, said exhaust system including a passage portion existing in the proximity of said engine body, and said air chamber of said air induction system, at least in part, being placed under said passage portion of said exhaust system, wherein said engine body has a plurality of combustion chambers, said engine further comprises an exhaust manifold extending from said engine body, said exhaust manifold having a plurality of passages each communicating with one of said combustion chambers, each one of said passages having a coolant jacket through which coolant passes, each one of said coolant jackets having an opening at each end of said passages, and a coolant delivery conduit affixed to said exhaust manifold, said coolant delivery conduit having openings each communicating with one of said coolant jackets.

9. A watercraft as set forth in claim 8 wherein said engine further comprises a fuel amount increase mechanism placed at one of said carburetors located at the most rearward position relative to said watercraft, said fuel amount increase mechanism has fuel supply conduits for supplying fuel to said respective carburetors.

10. A watercraft as set forth in claim 8 wherein said hull defines a rider's area, said engine further comprises a plurality of carburetors associated with said combustion chambers, each one of said carburetors has a throttle valve admitting air to the associated combustion chamber, a control mechanism arranged to control openings of said throttle valves remotely from said rider's area and an interlocking mechanism arranged to activate all the throttle valves simultaneously, said control mechanism is positioned at one side of said carburetors and said interlocking mechanism is positioned at another side of said carburetors.

11. A watercraft as set forth in claim 10 wherein said carburetors are spaced apart from each other along an axis of said watercraft extending from bow to stem, said engine further comprises a fuel amount increase mechanism placed at one of said carburetor located at the most rearward position relative to said watercraft, said fuel amount increase mechanism has fuel supply conduits for supplying fuel to said respective carburetors.

12. A watercraft comprising a hull and a propulsion device carried by said hull and driven by an engine disposed in the hull for propelling said watercraft, said engine comprising an engine body having a plurality of combustion chambers, an air induction system extending from said engine body for introducing air charge into said combustion chambers, and an exhaust system extending from said engine body for discharging exhaust gasses from said combustion chambers, said air induction system including an air chamber, said exhaust system including a passage portion existing in the proximity of said engine body, and said air chamber of said air induction system, at least in part, being placed under said passage portion of said exhaust system, wherein said hull defines a rider's area, said engine further comprises a plurality of carburetors associated with said combustion chambers, each one of said carburetors has a throttle valve admitting air to the associated combustion chamber, a control mechanism arranged to control openings of said throttle valves remotely from said rider's area and an interlocking mechanism arranged to activate all the throttle valves simultaneously, said control mechanism is positioned at one side of said carburetors and said interlocking mechanism is positioned at another side of said carburetors.

13. A watercraft as set forth in claim 12 wherein said carburetors are spaced apart from each other along an axis of said watercraft extending from bow to stern, said engine further comprises a fuel amount increase mechanism placed at one of said carburetor located at the most rearward position relative to said watercraft, said fuel amount increase mechanism has fuel supply conduits for supplying fuel to said respective carburetors.

14. A watercraft comprising a hull and a propulsion device carried by said hull and driven by an engine disposed in the hull for propelling said watercraft, said engine comprising an engine body having at least one combustion chamber, an air induction system extending from said engine body for introducing air charge into said combustion chamber, and an exhaust system extending from said engine body for discharging exhaust gasses from said combustion chamber, said air induction system including an air chamber, said exhaust system including a passage portion existing in the proximity of said engine body, and said air chamber of said air induction system, at least in part, being placed under said passage portion of said exhaust system, wherein said engine includes a plurality of combustion chambers, said engine further comprises a plurality of carburetors each associated with one of said combustion chambers and spaced apart from each other along a center axis of said watercraft extending from bow to stern, a fuel amount increase mechanism placed at one of said carburetors located at the most rearward position relative to said watercraft, and said fuel amount increase mechanism has fuel supply conduits for supplying fuel to said carburetors.

15. A watercraft comprising a hull and a propulsion device carried by said hull and driven by an engine disposed in said hull for propelling said watercraft, said engine comprising an engine body having a plurality of combustion chambers and a plurality of exhaust ports associated with said combustion chambers, an exhaust manifold having a plurality of passages each communicating with each one of said exhaust ports, said passages being unified together to define an outlet opening, said outlet opening having an end surface which is on a plane extending generally normal to an axis of said outlet opening, and a contiguous conduit coupled with said outlet opening, each one of said exhaust ports having an axis, and a line extending generally horizontally through all the axes and intersecting with said plane.

16. A watercraft as set forth in claim 15 wherein each of said plurality of exhaust ports is associated with one of said combustion chambers, said exhaust ports are disposed on a line extending longitudinally along said engine body, the exhaust manifold extends from said exhaust ports, and said exhaust manifold inclines relative to the line of said exhaust ports.

17. A watercraft as set forth in craft 15 wherein said exhaust manifold extends generally upwardly from said exhaust ports, and said contiguous conduit is coupled with said outlet opening of said exhaust manifold at a position higher than said line and curves downwardly from a portion coupled with said exhaust manifold.

18. A watercraft as set forth in claim 15 wherein each one of said passages has a coolant jacket through which coolant passes, each one of said coolant jackets being disposed around each one of said passages, and a coolant delivery conduit having a plurality of openings each associated with one of said coolant jackets so as to deliver coolant to said coolant jackets.

19. A watercraft as set forth in claim 18 wherein said hull defines a rider's area, said engine further comprises a plurality of carburetors each associated with one of said combustion chambers, each one of said carburetors has a throttle valve admitting air to the associated combustion chamber, a control mechanism arranged to control openings of said throttle valves remotely from said rider's area and an interlocking mechanism arranged to activate all the throttle valves simultaneously, said control mechanism is positioned at one side of said carburetors and said interlocking mechanism is positioned at another side of said carburetors.

20. A watercraft as set forth in claim 19 wherein said carburetors are spaced apart from each other along an axis of said watercraft extending from bow to stern, said engine further comprises a fuel amount increase mechanism placed at one of said carburetor located at the most rearward position relative to said watercraft, said fuel amount increase mechanism has fuel supply conduits for supplying fuel to said respective carburetors.

21. A watercraft as set forth in claim 15 wherein said hull defines a rider's area, said engine further comprises a plurality of carburetors associated with said combustion chambers, each one of said carburetors having a throttle valve admitting air to the associated combustion chamber, a control mechanism arranged to control openings of said throttle valves remotely from said rider's area, and an interlocking mechanism arranged to activate all the throttle valves simultaneously, said control mechanism is positioned at one side of said carburetors and said interlocking mechanism is positioned at another side of said carburetors.

22. A watercraft as set forth in claim 21 wherein said carburetors are spaced apart from each other along an axis of said watercraft extending from bow to stern, said engine further comprises a fuel amount increase mechanism placed at one of said carburetor located at the most rearward position relative to said watercraft, said fuel amount increase mechanism has fuel supply conduits for supplying fuel to said respective carburetors.

23. A watercraft as set forth in claim 15 wherein said engine body has at least three exhaust ports, said exhaust manifold has at least three passages, center lines extending through a pair of said passages intersect at a point, and center lines extending through another pair of said passages intersect at another point.

24. A watercraft comprising a hull and a propulsion device carried by said hull and driven by an engine disposed in said hull for propelling said watercraft, said engine comprising an engine body having at least three combustion chambers, and an exhaust system for discharging exhaust gases from said combustion chambers, said exhaust system including an exhaust manifold extending from said engine body and having an opening end, and a contiguous conduit connected to said opening end and extending generally along said engine body, said opening end inclining toward a direction in which said contiguous conduit extends, said exhaust system additionally including at least three exhaust ports associated with said combustion chambers, said exhaust manifold having at least three branches each connected to one of said exhaust ports, center lines extending through a pair of said branches intersect at a point, and center lines extending through another pair of said branches intersect at another point.

25. A watercraft comprises a hull and a propulsion device carried by said hull and driven by an engine disposed in said hull for propelling said watercraft, said engine comprising an engine body having a plurality of combustion chambers, an exhaust system for discharging exhaust gases from said combustion chambers, said exhaust system including an exhaust manifold extending from said engine body and having an opening end, a contiguous conduit connected to said opening end and extending generally along said engine body, said opening end inclining toward a direction in which said contiguous conduit extends, a plurality of carburetors associated with said combustion chambers and spaced apart from each other along a center axis of said watercraft extending from bow to stern, and a fuel amount increase mechanism placed at one of said carburetors located at the most rearward position relative to said watercraft, said fuel amount increase mechanism having fuel supply conduits for supplying fuel to said carburetors.

26. An engine for a watercraft having a hull and a propulsion device carried by said hull and driven by said engine for propelling said watercraft, said engine comprising an engine body having a plurality of combustion chambers, an exhaust system for discharging exhaust gasses from said combustion chambers, a cooling system for cooling said engine body and said exhaust system, said exhaust system including an exhaust manifold extending from said engine body and having a plurality of branches corresponding to said combustion chambers, said cooling system including a first coolant jacket extending through said manifold, said coolant jacket having branch openings at respective ends of said branches, and a single coolant delivery conduit having delivery openings directly connected to said branch openings for delivering coolant.

27. An engine as set forth in claim 26 wherein said coolant delivery conduit is made of a rigid material.

28. An engine as set forth in claim 26 wherein said cooling system supplies pressurized coolant to said coolant delivery conduit, and an inner diameter of said coolant delivery conduit positioned downstream is less than an inner diameter thereof positioned upstream.

29. An engine as set forth in claim 28 wherein said coolant delivery conduit is assembled with separate pieces having different inner diameters.

30. An engine as set forth in claim 28 wherein said coolant delivery conduit is made of a single pipe, an inner diameter of which is shrunk downstream than upstream.

31. An engine as set forth in claim 26 wherein said hull defines a rider's area, said engine further comprises a plurality of carburetors associated with said combustion chambers, each one of said carburetors has a throttle valve admitting air to the associated combustion chamber, a control mechanism arranged to control openings of said throttle valves remotely from said rider's area, and an interlocking mechanism arranged to activate all the throttle valves simultaneously, said control mechanism is positioned at one side of said carburetors and said interlocking mechanism is positioned at another side of said carburetors.

32. An engine as set forth in claim 31 wherein said carburetors are spaced apart from each other along an axis of said watercraft extending from bow to stern, said engine further comprises a fuel amount increase mechanism placed at one of said carburetor located at the most rearward position relative to said watercraft, said fuel amount increase mechanism has fuel supply conduits for supplying fuel to said respective carburetors.

33. An engine as set forth in claim 26 further comprising a plurality of carburetors associated with said combustion chambers and spaced apart from each other along a center axis of said watercraft extending from bow to stem, and a fuel amount increase mechanism placed at one of said carburetors located at the most rearward position relative to said watercraft, said fuel amount increase mechanism has fuel supply conduits for supplying fuel to said carburetors.

34. An engine as set forth in claim 26 wherein said engine body includes a second coolant jacket coupled with the first coolant jacket, the coolant being supplied to the second coolant jacket from the first coolant jacket.

35. An engine as set forth in claim 34 wherein an inner diameter of said coolant delivery conduit positioned downstream is less than an inner diameter thereof positioned upstream.

36. An engine for a watercraft having a hull defining a rider's area and a propulsion device carried by said hull and driven by said engine for propelling said watercraft, said engine comprising an engine body having a plurality of combustion chambers, a plurality of throttle devices corresponding to said combustion chambers and each having a throttle valve for supplying air fuel mixture for combustion in said each combustion chamber, a control mechanism for controlling an opening of at least one of said throttle valves remotely from said rider's area and an interlocking mechanism for activating said throttle valves simultaneously, said control mechanism being positioned at one side of said throttle devices and said interlocking mechanism being positioned at another side of said throttle devices.

37. An engine as set forth in claim 36 wherein said control mechanism includes a pulley connected to one of said throttle valves and rotated by means of a control wire which is operated from said rider's area.

38. An engine as set forth in claim 36 wherein said interlocking mechanism includes throttle levers connected to respective throttle valves and a connecting rod linking said throttle levers together.

39. An engine as set forth in claim 36 wherein said engine further comprises an exhaust system for discharging exhaust gasses from said combustion chambers, said exhaust system has a passage portion in the proximity to said throttle devices, and said control mechanism confronts said passage portion of the exhaust system.

40. An engine as set forth in claim 39 wherein said passage portion contains a catalyst for removing a contaminator in the exhaust gasses.

41. An engine as set forth in claim 36 wherein said control mechanism is positioned at a top side of said throttle devices.

42. An engine as set forth in claim 36 wherein said throttle devices includes an idle adjustment mechanism arranged to adjust an idle opening of said throttle valves, said idle adjustment mechanism has an adjusting member positioned apart from a major portion of said adjustment mechanism and higher than said major portion, the adjusting member being coupled with the major portion by a coupling member.

43. An engine as set forth in claim 36 wherein said throttle devices are spaced apart from each other along a center axis of said watercraft extending from bow to stem, said engine further comprises a fuel amount increase mechanism placed at one of said carburetors located at the most rearward position relative to said watercraft, said fuel amount increase mechanism has fuel supply conduits for supplying fuel to said throttle devices.

44. An engine for a watercraft having a hull and a propulsion device carried by said hull and driven by said engine for propelling said watercraft, said engine comprising an engine body having a plurality of combustion chambers, a plurality of carburetors corresponding to said combustion chambers having throttle valves for supplying air fuel mixture for combustion in said each combustion chamber, and a fuel increase mechanism placed at one carburetor located at the most rearward position relative to said watercraft and having fuel supply conduits for supplying fuel to said respective carburetors.

45. A watercraft as set forth in claim 44, in combination with a watercraft having a hull which defines a rider's area, said engine includes a control mechanism for controlling an opening of said throttle valves remotely from said rider's area, and fuel increase mechanism is operable by means of said control mechanism.

46. A watercraft as set forth in claim 45 wherein said fuel increase mechanism is an accelerator pump.

47. A watercraft comprising a hull defining a rider's area, an engine disposed in said hull and having an engine body with a plurality of combustion chambers, a plurality of throttle devices associated with said combustion chambers, each one of said throttle devices including a throttle valve admitting air to the associated combustion chamber, a control mechanism arranged to control openings of said throttle valves remotely from said rider's area, and a linkage mechanism arranged to activate all the throttle valves simultaneously, and said, control mechanism being positioned at a top side of said throttle devices.

48. A watercraft as set forth in claim 47 wherein said control mechanism includes a control member coupled with one of said throttle valves, and said control member is operable by a control wire from said rider's area.

49. A watercraft as set forth in claim 47 wherein said linkage mechanism includes a plurality of throttle levers each coupled with each one of said throttle valves, and a rod member coupling together all the throttle levers.

50. A watercraft comprising a hull, an engine disposed in said hull and having an engine body including a plurality of combustion chambers, a plurality of carburetors associated with said combustion chambers and spaced apart from each other along a center axis of said watercraft extending from bow to stern, and a fuel amount increase mechanism placed at one of said carburetors located at the most rearward position relative to the watercraft, said fuel amount increase mechanism having fuel supply conduits arranged to supply fuel to said carburetors.

51. A watercraft as set forth in claim 50 wherein said hull defines a rider's area, and said fuel amount increase mechanism is remotely controlled from said rider's area.

* * * * *